(12) United States Patent
Vahalia et al.

(10) Patent No.: US 6,389,420 B1
(45) Date of Patent: May 14, 2002

(54) FILE MANAGER PROVIDING DISTRIBUTED LOCKING AND METADATA MANAGEMENT FOR SHARED DATA ACCESS BY CLIENTS RELINQUISHING LOCKS AFTER TIME PERIOD EXPIRATION

(75) Inventors: Uresh K. Vahalia, Waban; Xiaoye Jiang, Shrewsbury; Jeffrey Jon Darcy, Lexington; Boris Zuckerman, Marblehead; Ronald Curtis Searls, North Andover, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/410,514

(22) Filed: Sep. 30, 1999

(51) Int. Cl.$^7$ ................................................. G06F 17/30
(52) U.S. Cl. ............................. 707/8; 707/10; 707/201; 709/248
(58) Field of Search .......................... 707/8, 9, 10, 200, 707/201, 202, 203, 204, 205; 709/248, 232, 229; 714/4

(56) References Cited

U.S. PATENT DOCUMENTS

| | | | |
|---|---|---|---|
| 5,175,852 A | 12/1992 | Johnson et al. ................. | 707/8 |
| 5,226,143 A | 7/1993 | Baird et al. ................... | 711/145 |
| 5,226,159 A | 7/1993 | Henson et al. .................. | 707/8 |
| 5,594,863 A | 1/1997 | Stiles .......................... | 714/15 |
| 5,737,747 A | 4/1998 | Vishlitzky et al. .......... | 711/118 |
| 5,893,140 A | 4/1999 | Vahalia et al. ............... | 711/118 |
| 5,950,203 A | 9/1999 | Stakuis et al. ................. | 707/10 |
| 5,987,477 A | * 11/1999 | Schmuck et al. .............. | 707/10 |
| 6,023,706 A | * 2/2000 | Schmuck et al. ............ | 707/200 |
| 6,032,216 A | * 2/2000 | Schmuck et al. ............ | 710/200 |
| 6,173,293 B1 | * 1/2001 | Thekkath et al. ........... | 707/201 |
| 6,324,581 B1 | * 11/2001 | Xu et al. ...................... | 709/229 |

OTHER PUBLICATIONS

"A Common Internet File System (CIFS/1.0) Protocol" by Paul J. Leach and Dilip C. Naik, *Network Working Group, Internet–Draft*, draft–leach–cifs–v1–spec–01.txt, Dec. 19, 1997, pp. 1–121.

"NFS: Network File System Protocol Specification", *Network Working Group*, RFC 1094, http://www.attrition.org/~modify/texts/rfc/rfc1094.txt, *Sun Microsystems, Inc.*, Mar. 1989, pp. 1–23.

* cited by examiner

*Primary Examiner*—Diane D. Mizrahi
*Assistant Examiner*—Haythim Alaubaidi
(74) *Attorney, Agent, or Firm*—Howrey Simon Arnold & White, BBP

(57) ABSTRACT

File locks and file metadata are distributed from a file manager to clients in a data network to permit the clients to share access to file data in data storage. The file manager is permitted to grant a second lock upon the file data without necessarily receiving notification from a client that it has relinquished a first lock on the file data while ensuring that conflicting locks are never granted. The client sets the beginning of a first period of time over which the client may access the file data once the first lock on the file data has been granted by the file manager, and the client sends a lock request to the file manager. The file manager responds by setting the beginning of a second period of time such that the first period of time is certain to have expired once the second period of time has expired, granting the first lock upon the file data to the client, and transmitting a lock grant message to the client. The client receives the lock grant message, and accesses the file data so long as the client's access to the file data will be completed by expiration of the first period of time.

70 Claims, 13 Drawing Sheets

FILE MANAGER PROVIDING DISTRIBUTED LOCKING AND METADATA MANAGEMENT FOR SHARED DATA ACCESS BY CLIENTS RELINQUISHING LOCKS AFTER TIME PERIOD EXPIRATION

BACKGROUND OF THE INVENTION

1. Field of the Invention

The present invention relates generally to data storage systems, and more particularly to network file servers. In particular, the present invention relates to a data storage network in which file locks and file metadata are distributed to clients and the clients are responsible for respecting the file locks when accessing file data.

2. Description of the Related Art

Mainframe data processing, and more recently distributed computing, have required increasingly large amounts of data storage. This data storage is most economically provided by an array of low-cost disk drives integrated with a large semiconductor cache memory. Such cached disk arrays were originally introduced for use with IBM host computers. A channel director in the cached disk array executed channel commands received over a channel from the host computer.

More recently, the cached disk array has been interfaced to a data network via at least one data mover computer. The data mover computer receives data access commands from clients in the data network in accordance with a network file access protocol such as the Network File System (NFS). (NFS is described, for example, in RFC 1094, Sun Microsystems, Inc., "NFS: Network File Systems Protocol Specification," Mar. 1, 1989.) The data mover computer performs file locking management and mapping of the network files to logical block addresses of storage in the cached disk storage subsystem, and moves data between the client and the storage in the cached disk storage subsystem.

In relatively large networks, it is desirable to have multiple data mover computers that access one or more cached disk storage subsystems. Each data mover computer provides at least one network port for servicing client requests. Each data mover computer is relatively inexpensive compared to a cached disk storage subsystem. Therefore, multiple data movers can be added easily until the cached disk storage subsystem becomes a bottleneck to data access. If additional storage capacity or performance is needed, an additional cached disk storage subsystem can be added. Such a storage system is described in Vishlitzky et al. U.S. Pat. 5,737,747 issued Apr. 7, 1998, entitled "Prefetching to Service Multiple Video Streams from an Integrated Cached Disk Array," incorporated herein by reference.

Unfortunately, data consistency problems may arise if concurrent client access to a read/write file is permitted through more than one data mover. These data consistency problems can be solved in a number of ways. For example, as described in Vahalia et al., U.S. Pat. 5,893,140 issued Apr. 6, 1999, entitled "File Server Having a File System Cache and Protocol for Truly Safe Asynchronous Writes," incorporated herein by reference, locking information can be stored in the cached disk array, or cached in the data mover computers if a cache coherency scheme is used to maintain consistent locking data in the caches of the data mover computers.

Another known solution to the data consistency problem is to access each file system through only one data mover computer. The data mover through which the file system is accessible is said to own the file system. If a data mover computer receives a request for access to a file system that is owned by another data mover computer, then the request is forwarded to the data mover that owns the file system. Although it is relatively easy to forward data access requests from one data mover to another, this scheme is rather costly in terms of system resources to pass read or write data from one data mover to another.

SUMMARY OF THE INVENTION

In a data storage network in which file locks and metadata are distributed to clients and the clients having the locks are permitted to directly access file data using the metadata, a problem has been found to arise when a file manager fails to receive notification of a client's release of a file lock. The file manager may fail to receive such a notification due to a failure of the client or a failure of a network link to the client. To avoid corruption of file data, it is imperative that conflicting locks are never granted to the clients. However, any delay in a file manager concluding that a lock has been released will impact performance specifications for the system. Moreover, ambiguity in the lock status as recorded in nonvolatile memory may prevent complete recovery from a system failure.

In accordance with a first aspect, the present invention provides a method of operation in a data storage network in which file locks and file metadata are distributed from at least one file manager to network clients to permit the network clients to share access to file data in data storage. The method permitts the file manager to grant a second lock upon the file data without necessarily receiving notification from a client that it has relinquished a first lock on the file data while ensuring that conflicting locks are never granted. The method includes a client setting the beginning of a first period of time over which the client may access the file data once the first lock on the file data has been granted by the file manager, and the client sending a lock request to the file manager for obtaining the first lock on the file data. The file manager receives the lock request from the client, and responds by setting the beginning of a second period of time such that the first period of time is certain to have expired once the second period of time has expired, granting the first lock upon the file data to the client, and transmitting a lock grant message to the client. The client receives the lock grant message, and accesses the file data so long as the client's access to the file data will be completed by expiration of the first period of time. Therefore, the file manager is free to grant a second lock upon the file data after expiration of the second period of time without conflict between the first lock upon the file data and the second lock upon the file data.

In accordance with another aspect, the invention provides a data storage network. The data storage network includes data storage and at least one file manager coupled to network clients for distributing file locks and file metadata from the file manager to the network clients to permit the network clients to share access to file data in the data storage. The file manager is permitted to grant a second lock upon the file data without necessarily receiving notification from a client that it has relinquished a first lock on the file data while ensuring that conflicting locks are never granted. A network client and the lock manager are programmed to grant, use, and release the first lock on the file data by: (a) the client setting the beginning of a first period of time over which the client may access the file data once the first lock on the file data has been granted by the file manager, and the client sending a lock request to the file manager for obtaining the first lock on the file data; (b) the file manager receiving the lock request from the client, and responding by setting the beginning of a second period of time such that the first period of time is certain to have expired once the second period of time has expired, and granting the first lock upon the file data to the client, and transmitting a lock grant message to the client; and (c) the client receiving the lock grant message, and accessing the file data so long as the client's access to the file data will be completed by expiration of the first period of time. Therefore, the file manager is free to grant a second lock upon the file data after expiration of the second period of time without conflict between the first lock upon the file data and the second lock upon the file data.

In accordance with still another aspect, the invention provides a file manager for use in a data storage network in which file locks and file metadata are distributed from the file manager to the network clients to permit the network clients to share access to file data in the data storage. The file manager includes a processor, a memory coupled to the processor for execution of a program contained in the memory, and a network port for coupling the processor to the network clients for the distribution of the file locks and the file metadata to the clients. The program is executable by the processor for the file manager receiving a lock request from the client, and responding by setting the beginning of a period of time such that the period of time is certain to have expired once the client relinquishes a lock upon the file data, granting the lock upon the file data, and transmitting a lock grant message to the client.

In accordance with yet another aspect, the invention provides a client for use in a data storage network including at least one file manager distributing file locks and file metadata from the file manager to network clients to permit the network clients to share access to file data in data storage. The client includes a processor, a memory coupled to the processor for execution of a program contained in the memory, and a network port for coupling the processor to the file manager for receiving file locks and the file metadata from the file manager. The program is executable by the processor for the client setting the beginning of a period of time over which the client may access the file data once a lock on the file data has been granted by the file manager, and the client sending a lock request to the file manager for obtaining the lock on the file data. The program is further executable by the processor for the client receiving a lock grant message from the file manager, and accessing the file data so long as the client's access to the file data will be completed by expiration of the period of time.

In accordance with still another aspect, the invention provides a program storage device containing a program for a file manager in a data storage network in which file locks and file metadata are distributed from the file manager to the network clients to permit the network clients to share access to file data in the data storage. The program is executable by the file manager for the file manager receiving a lock request from the client, and responding by setting the beginning of a period of time such that the period of time is certain to have expired once the client relinquishes a lock upon the file data, and granting the lock upon the file data, and transmitting a lock grant message to the client.

In accordance with a final aspect, the invention provides a program storage device containing a program for a client for use in a data storage network including at least one file manager distributing file locks and file metadata from the file manager to network clients to permit the network clients to share access to file data in data storage. The program is executable by the client for setting the beginning of a period of time over which the client may access the file data once a lock on the file data has been granted by the file manager, and the client sending a lock request to the file manager for obtaining the lock on the file data. The program is further executable by the client for receiving a lock grant message from the file manager, and accessing the file data so long as the client's access to the file data will be completed by expiration of the period of time.

BRIEF DESCRIPTION OF THE DRAWINGS

Other objects and advantages of the invention will become apparent upon reading the following detailed description with reference to the accompanying drawings wherein.

Figure 1:
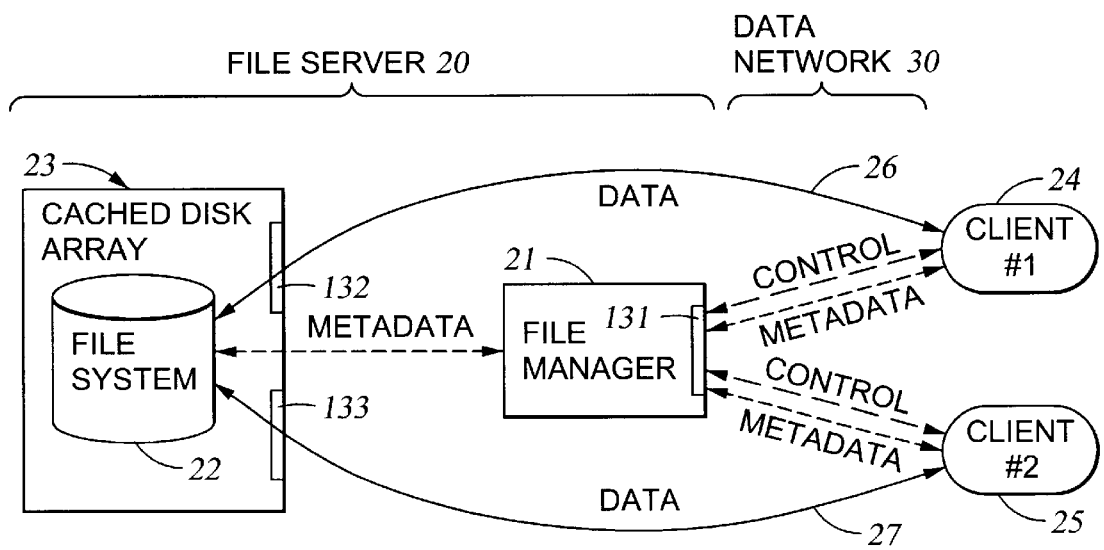
FIG. 1 is a block diagram of a data storage network in which a client requests a distributed file lock from a file manager and receives metadata from the fileserver in order to directly access the file in data storage of the file server.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Referring to FIG. 1, there is shown a network file server architecture that uses distributed locking. In this example, a file server 20 includes a file manager computer 21 and data storage such as a file system 22 in a cached disk array 23. The file manager computer 21, for example, is a high-end commodity computer including a single-chip processor, a PCI or EISA bus, random access memory, a hard disk drive for nonvolatile program storage, and a floppy disk drive for loading programs. The cached disk array 23, for example, is a Symmetrix 5500 (Trademark) cached disk array manufactured and sold by EMC Corporation, 171 South Street, Hopkinton, Mass. 01748–9103. The file manager 21 manages file locking information and metadata for the files in the file system 22. The file locking information and metadata are stored in the cached disk array 23, and the file manager 21 maintains a cache memory of recently accessed file locking information and metadata. Alternatively, the file locking information and metadata could be stored in nonvolatile disk memory in the file manager 21, for example on a mirrored pair of disk drives in the file manager 21.

As shown in FIG. 1, the file manager 21 has at least one network port 131 connected through a data network 30 to a first client 24 and a second client 25. The network port 131 is shared among requests from the clients 24, 25, although a separate respective network port could be provided for each of the clients 24, 25. Each client 24, 25 also has a respective bypass data path 26, 27 that bypasses the file manager 21 for reading data from and writing data to the file system 22. The cached disk array 23 has one network port 132 for the bypass data path 26, and another network port 133 for the bypass data path 27. Alternatively, the two bypass data paths 26, 27 could share one network port of the cached disk array 23, although such sharing could limit the maximum data transfer rate to the data storage in the cached disk array for simultaneous data access by the clients 24, 25. Before reading or writing to the file system 22, a client first issues a request for metadata to the file manager 21. The file manager 21 responds by placing an appropriate lock on the file to be accessed, and returning metadata including pointers to where the data to be accessed is stored in the file system. The client uses the metadata to formulate a read or write request sent over the bypass data path to the file system 22. If the write request changes the file attributes, then the client writes the new file attributes to the file manager 21 after the data is written to the file system 22.

Figure 2:
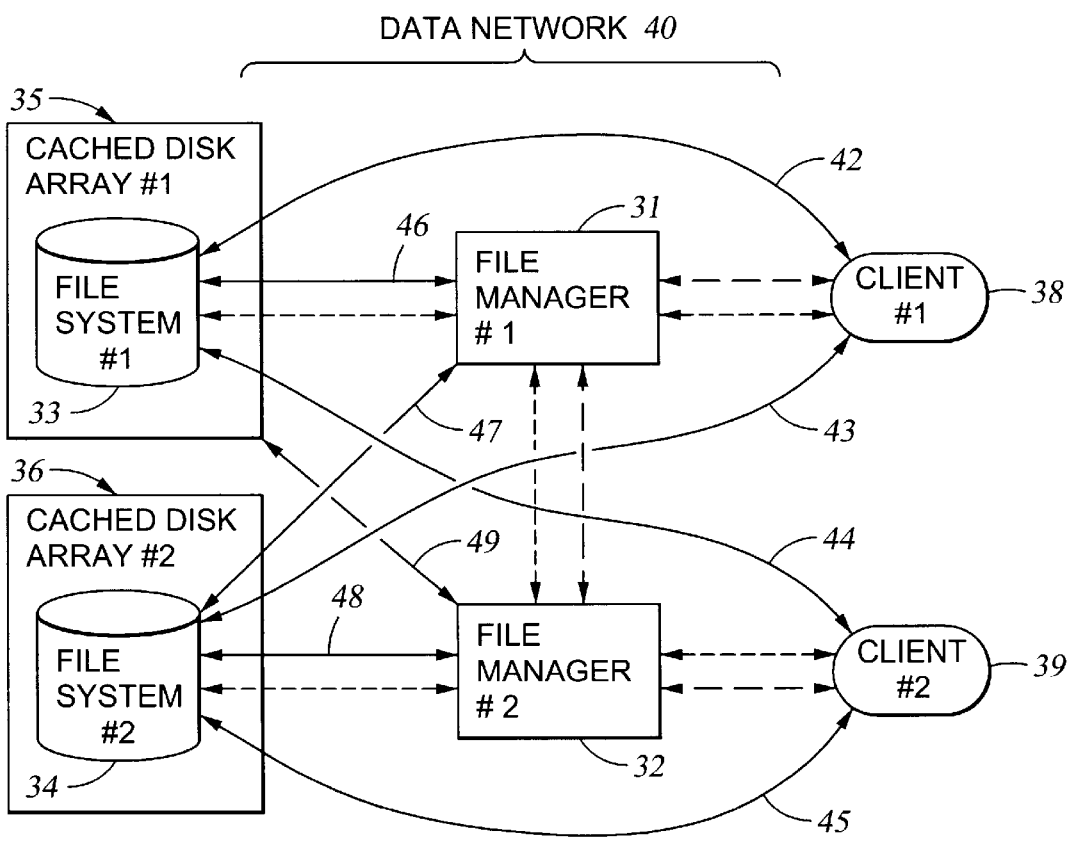
FIG. 2 is a block diagram of a more complex data storage network including more than one file manager and more than one file system, in which access to each file system is managed by one and only one of the file managers.

With reference to FIG. 2, there is shown a more complex network file server architecture that permits storage resources to be incrementally added to provide sufficient storage capacity for any desired number of file systems. In this example, a data network 40 includes a first file manager computer 31, a second file manager computer 32, a first cached disk array 35, a second cached disk array 36, a first client 38, and a second client 39. In this example, the data movers 31, 32 and the cached disk arrays 35, 36 could be spaced from each other, placed at various geographic locations, and interconnected by high-speed Fibre Channel data links. Alternatively, the cached disk arrays 35, 36 and file manager computers 31, 32 could be placed in the same geographic location. For example, if the cached disk arrays and file manager computers were placed in the same geographic location, they could be constructed and interconnected as shown in Vahalia et al. U.S. Pat. 5,893,140, issued Apr. 6, 1999, incorporated herein by reference.

In FIG. 2, the first file manager 31 manages the file locking information and metadata of a first file system 33 in the first cached disk array 35, and the second file manager 32 manages the file locking information and metadata of a second file system 34 in the second cached disk array 36. In particular, the file locking information and metadata for each file system 33, 34 is managed exclusively by only one of the file mangers 31, 32. This exclusive relationship will be referred to by saying each file system has a respective file manager that is the owner of the file system. Therefore, the first file manager 31 is the owner of the first file system 33, and the second file manager 32 is the owner of the second file system 34.

The first file manager 31 is connected to the first cached disk array 35 for the communication of metadata of the first file system 33, and the second file manager 32 is connected to the second cached disk array 36 for the communication of metadata of the second file system 34. The first file manager 31 is connected to the second file manager 32 for the communication of metadata and control information with respect to the first file system 33 and the second file system 34. The first file manager 31 is linked to a first client 38 for the communication of metadata and control information with respect to the first file system 33 and the second file system 34. The second file manager 32 is linked to a second client 39 for the communication of metadata and control information with respect to the first file system 33 and the second file system 34.

The first client 38 has a bypass data path 42 to the first file system 33 for bypassing the first file manager 31, and a bypass data path 43 to the second file system 34 for bypassing the first file manager 31 and also bypassing the second file manager 32. The second client 39 has a bypass data path 34 to the first file system 33 for bypassing the first file manager 31 and the second file manager 32, and a bypass data path 45 to the second file system 34 for bypassing the second file manager 32.

The first client 38 accesses the first file system 33 in the fashion described above with respect to FIG. 1, by obtaining metadata from the first file manager 31 and then accessing the first file system over the bypass data path 42. To access the second file system 34, however, the first client issues a request for metadata to the first file manager 31. The first file manager 31 recognizes that it is not the owner of the file system to be accessed, and therefore forwards the request to the second file manager 32. The second file manager 32 responds by placing an appropriate lock on the file to be accessed, and returning metadata including pointers to where the data to be accessed is stored in the second file system. The first file manager 31 relays the metadata to the first client 38. The first client uses the metadata to formulate a read or write request sent over the bypass data path 43 to the second file system 22. If the write request changes the file attributes, then the first client writes the new file attributes to the first file manager 31 after the data is written to the second file system 34, and the first file manager forwards the new file attributes to the second file manager 32.

In a similar fashion, the second client 39 accesses the second file system 34 in the fashion described above with respect to FIG. 1, by obtaining metadata from the second file manager 31 and then accessing the second file system over the bypass data path 45. To access the first file system 33, the second client 39 issues a request for metadata to the second file manager 32. The second file manager 32 recognizes that it is not the owner of the file system to be accessed, and therefore forwards the request to the first file manager 31. The first file manager 31 responds by placing an appropriate lock on the file to be accessed, and returning metadata including pointers to where the data to be accessed is stored in the first file system. The second file manager 32 relays the metadata to the second client 38. The second client uses the metadata to formulate a read or write request sent over the bypass data path 44 to the first file system 33. If the write request changes the file attributes, then the second client writes the new file attributes to the second file manager 32 after the data is written to the first file system 33, and the second file manager forwards the new file attributes to the first file manager 32.

In the storage network of FIG. 2, the file managers may also access file data in the file systems 33, 34 in the cached disk arrays 35, 36. For example, the first file manager 31 has a data path 46 to the first cached disk array 35, and a data path 47 to the second cached disk array 36 that bypasses the second file manager 32. The second file manager 32 has a data path 48 to the second cached disk array 36, and a data path 49 to the first cached disk array that bypasses the first file manager 31. If a file manager desires to directly access data of a file in a file system that is owned by another file manager, it must ask the owner for metadata and a lock on the file before accessing the file data, and if the file manager modifies the metadata of the file, then the file manager must return the modified metadata to the owner of the file system.

In the storage network of FIG. 1 or FIG. 2, a problem has been found to arise when a file manager fails to receive notification of a client's release of a file lock. The file manager may fail to receive such a notification due to a failure of the client or a failure of a network link to the client. To avoid corruption of file data, it is imperative that conflicting locks are never granted to the clients. However, any delay in a file manager concluding that a lock has been released will impact performance specifications for the system. In accordance with an important aspect of the present invention, this problem is solved by establishing a grace period after which the file manager may correctly assume that a lock granted to a client is released by the client even though the file manager may fail to receive notification of the client's release of the lock.

Figure 3:
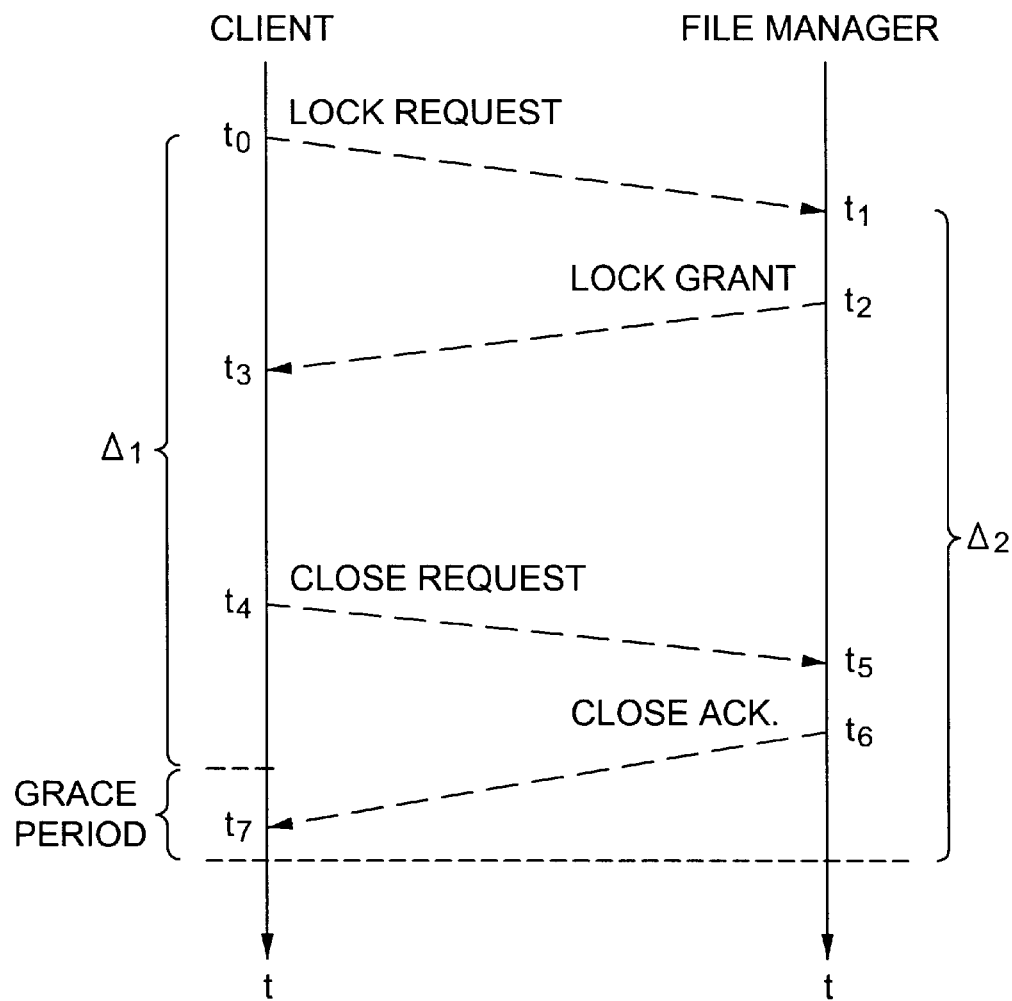
FIG. 3 is a timing diagram for the issuance and use of a distributed lock in the data storage network of FIG. 1 or FIG. 2, in which a grace period is established to ensure that a file manager can quickly release a client's lock even though the file manager fails to receive an indication from the client that the client is finished accessing the file.

In a specific embodiment, as shown in FIG. 3, for example, upon transmitting a lock request to a file manager at a time t-0, the client sets a timer to establish a period delta-1 during which the client may access a file provided that the file manager owning the file grants the lock request. Upon receiving the lock request at a time $t_1$, the lock manager sets a timer to establish a period $\Delta_2$ during which the file manager assumes that the client could be accessing the file provided that the file manager grants the lock. In this example, the file manager grants the lock and at a time $t_2$ returns a lock grant message to the client. The client receives the lock grant message at a time $t_3$, and access the file. By a time $t_4$ the client is finished accessing the file, and sends a close request to the file manager. At a time $t_5$, the file manager receives the close request, and at a time $t_6$ returns a close acknowledgement to the client. The client receives the close acknowledgement at a time $t_7$.

For the timing diagram in FIG. 3, it is seen that the grace period has a duration of $(t_1-t_0)+\Delta_2-\Delta_1$. The time $(t_0-t_1)$ is the delay of transmission of the lock request from the client to the file manager, and this delay inherently is a positive value. Therefore, the grace period can be established, for example, by setting $\Delta_2$ equal to $\Delta_1$. More generally, the grace period can be established by setting $\Delta_2$ to be greater than the difference between $\Delta_1$ and the minimum possible value of the delay $(t_1-t_0)$ for transmission of a lock request from the client to the file manager.

Once the grace period is established, the file manager may log an error if it fails to receive a close request by about the end of the period $\Delta_2$, but it still may assume that the client is no longer accessing the file after the period $\Delta_2$.

Figure 4:
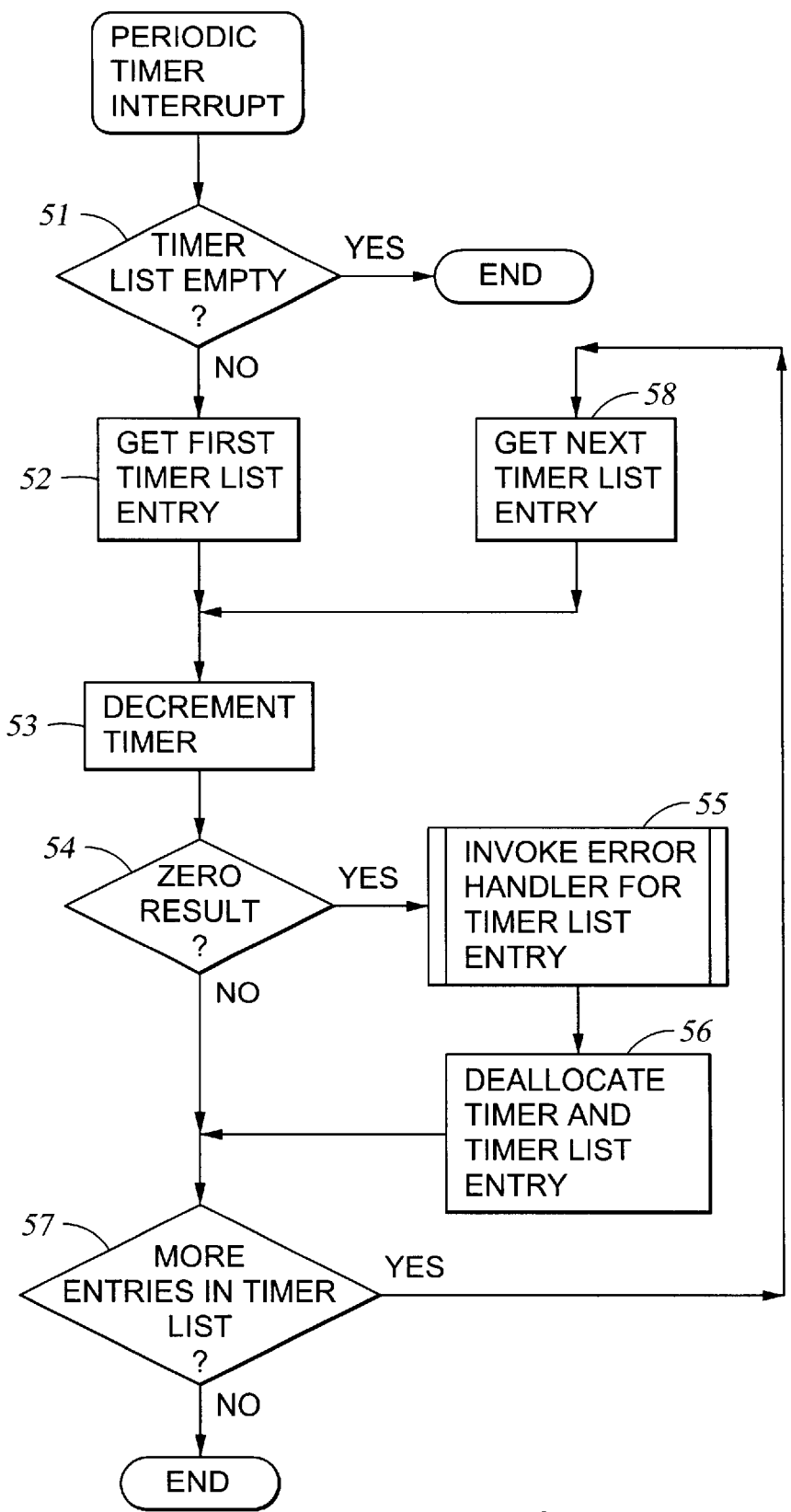
FIG. 4 is a flow chart of a procedure used in the file managers and clients of FIGS. 1 and 2 for servicing timers that ensure the timing relationships of FIG. 3.

The timing relationship of FIG. 3 can be enforced by lock expiration timers in the file managers and in the clients. Each client allocates a respective lock expiration timer when it requests each lock, and each file manager allocates a respective lock expiration timer for each granted lock. Each lock expiration timer is a random access memory location that is periodically decremented in response to a timer interrupt. For example, the lock expiration timers are dynamically allocated and are linked in a list. In such a case, the lock expiration timers are serviced by an interrupt routine as shown in FIG. 4. In a first step 51, the interrupt routine is finished if the timer list is empty. Otherwise, execution continues to step 52. In step 52, an index pointer is set to point to the first timer in the list. Then, in step 53, a memory-indexed decrement instruction is executed to decrement the timer. Then, in step 54, execution branches to step 55 if the result of the decrement operation is zero.

In step 55, an error handler for the timer list entry is invoked for execution upon completion of the periodic timer interrupt routine. For example, each entry in the list includes the timer, a lock identifier indexing information about the lock associated with the timer, a pointer to the previous entry in the list, and a pointer to the next entry in the list. In the case of a client, the error handler reports a failure of the client to send in a timely fashion a close request for the lock or an extension request for the lock to the file manager having granted the lock. In the case of a file manager, the error handler reports a failure to receive in a timely fashion a close request for the lock or an extension request for the lock from the client having been granted the lock. In step 56, the list entry including the timer is deallocated by being unlinked from the list and instead being linked to a list of free entries.

Execution continues from step 56 to step 57. Execution also continues to step 57 from step 54 if the result of decrementing the timer in step 53 is not zero. In step 57, execution branches to step 58 if there are more entries in the timer list.

In addition to the establishment of the grace period, the file manager maintains a log of file locking activity in order to facilitate recovery of a system failure that may disrupt operation of the file manager. Sufficient information is recorded in this log to avoid ambiguity as to what files were open at the time of the system failure and as to what clients may have been accessing the open files at the time of the system failure.

Figure 5:
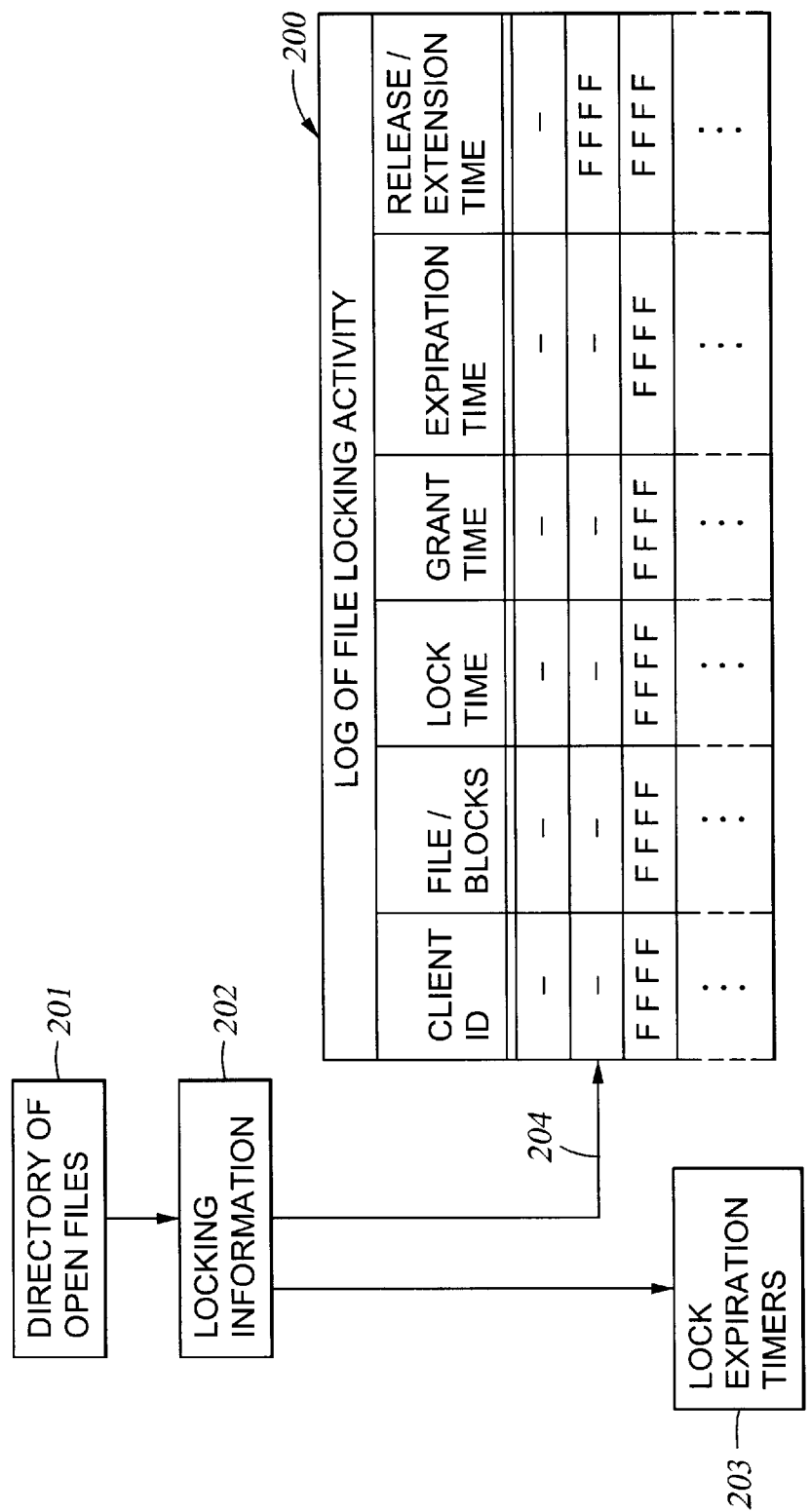
FIG. 5 is a schematic representation of data structures in the file manager associated with locking information, including a log file maintained for use during recovery from a system failure.

With reference to FIG. 5, for example, the log 200 is in the form of a file of fixed-length records. Each record includes information associated with a particular lock granted to a particular client. Each record includes a client identification (ID) field, a field identifying the file or range of storage blocks subject to the lock, a field identifying the lock type (e.g., read only lock, read-write lock), a field identifying the lock grant time, a field identifying the lock expiration time, and a field identifying the lock release or extension time. The lock grant time, for example, corresponds to the time $t_1$ in FIG. 3, the lock expiration time corresponds to the time $t_1+\Delta_2$ in FIG. 3, and the lock release or extension time corresponds to the time $t_5$ in FIG. 3. The log file, for example, has a fixed size, and a current record is identified by a write pointer 204. The write pointer 204 is successively incremented, and when the end of the file has been reached, the write pointer is returned to the beginning of the file. The file is sufficiently large that records for unreleased or unextended locks are never written over. The entries are ordered by the lock grant time. The most current valid entry has the most recent lock grant time. Invalid fields are indicated by "FFF . . . F". Initially all entries in the log file are invalidated. An entire record can be written in one atomic operation, for example, each record is part of a single block that resides in no more than one physical track in disk storage. Upon recovery from a system failure, the lock grant time and the release/extension time fields are scanned for records having a valid lock grant time and an invalid release/extension time. Such records indicate locks granted but not released at the time of the system failure, and the clients and files or blocks associated with these records can be investigated for recovery or invalidation of file data stored in the files or blocks.

The records in the log file associated with open files and current locks are also maintained in a local cache of locking information 202. In addition, each record in the local cache of locking information includes the index to the associated log entry, and an index to the lock expiration timer 203. The locking information 202 is indexed by a directory of open files 201. For example, when a client request for a lock specifies the file to be opened for the client, and the specified file identifier is used as a search key in the directory in order to determine whether or not the locking information 202 includes one or more current locks upon the file.

Figure 6:
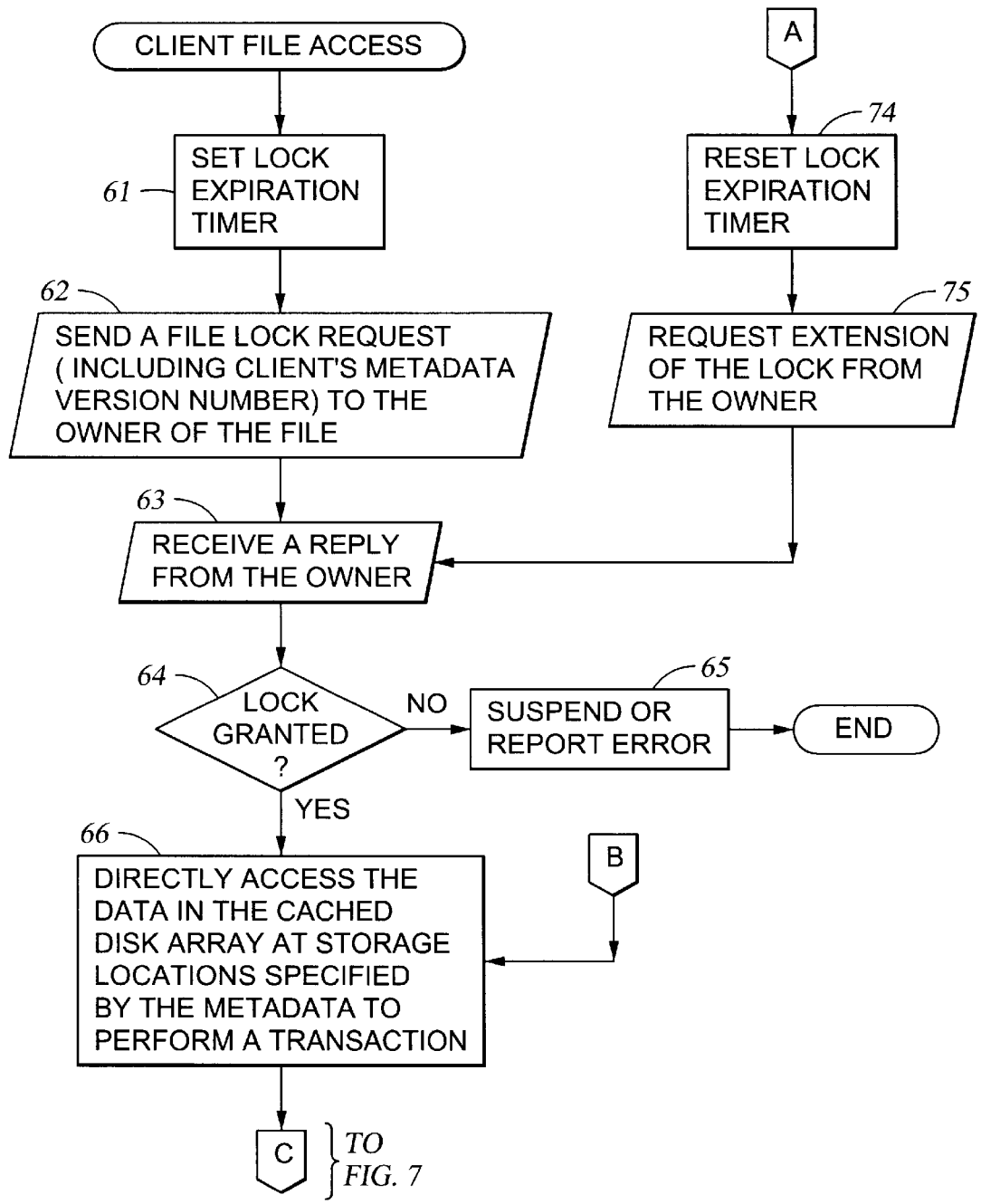
FIG. 6 is a first portion of a flow chart of a procedure used by the client for accessing data in a file.

With reference to FIG. 6, there is shown a flowchart of a procedure executed by a client for accessing a file in the storage network. In a first step 61, a lock expiration timer is set. The lock expiration timer measures the period $\Delta_1$ in FIG. 3, and it is set to an initial value corresponding to $\Delta_1$. The duration $\Delta$ could be a predetermined constant, or it could be a variable value specified by a client application. If the duration $\Delta_1$ is variable value, then the variable value could be included in the lock request transmitted from the client to the file manager than owns the file to be accessed.

In step 62, the client processor sends a file lock request to the file manager that is the owner of the file to be accessed. This could be done by the client processor sending the file lock request directly to the file manager that is the owner of the file to be accessed, or by the client processor sending the file lock request to another file manager that forwards the request to the file manager that is the owner of the file to be accessed. In the system of FIG. 1 or FIG. 2, the client may also send a metadata version number with the lock request. The metadata version number specifies a particular version of any metadata for the file that the client may have in a local cache. In step 63, the file manager waits until a reply is received from the client manager that is the owner of the file to be accessed. In step 64, execution branches to step 65 if the requested lock is not granted. In step 65, the client suspends processing of the client application needing access to the file if the requested lock has been denied because an inconsistent file lock exists upon the file, or else an error is reported to the client application needing access to the file, and the client file access procedure is finished.

In step 64, execution continues to step 66 if the requested lock has been granted. If the lock is granted, the client also returns metadata for the file, unless the metadata version number received from the client along with the lock request specifies the most current version of the metadata for the file. In this case, the client does not need metadata from the file manager because the client's local cache contains the most recent version of the metadata for the file. In step 66, the client directly accesses the data in the cached disk array containing the file at storage locations specified by the metadata in order to perform a transaction. For example, the period $\Delta_1$ is sufficiently long for the performance of a number of read-write operations for at least one transaction. When these read-write operations are completed for one transaction, execution continues from step 66 in FIG. 6 to step 67 in FIG. 7.

Figure 7:
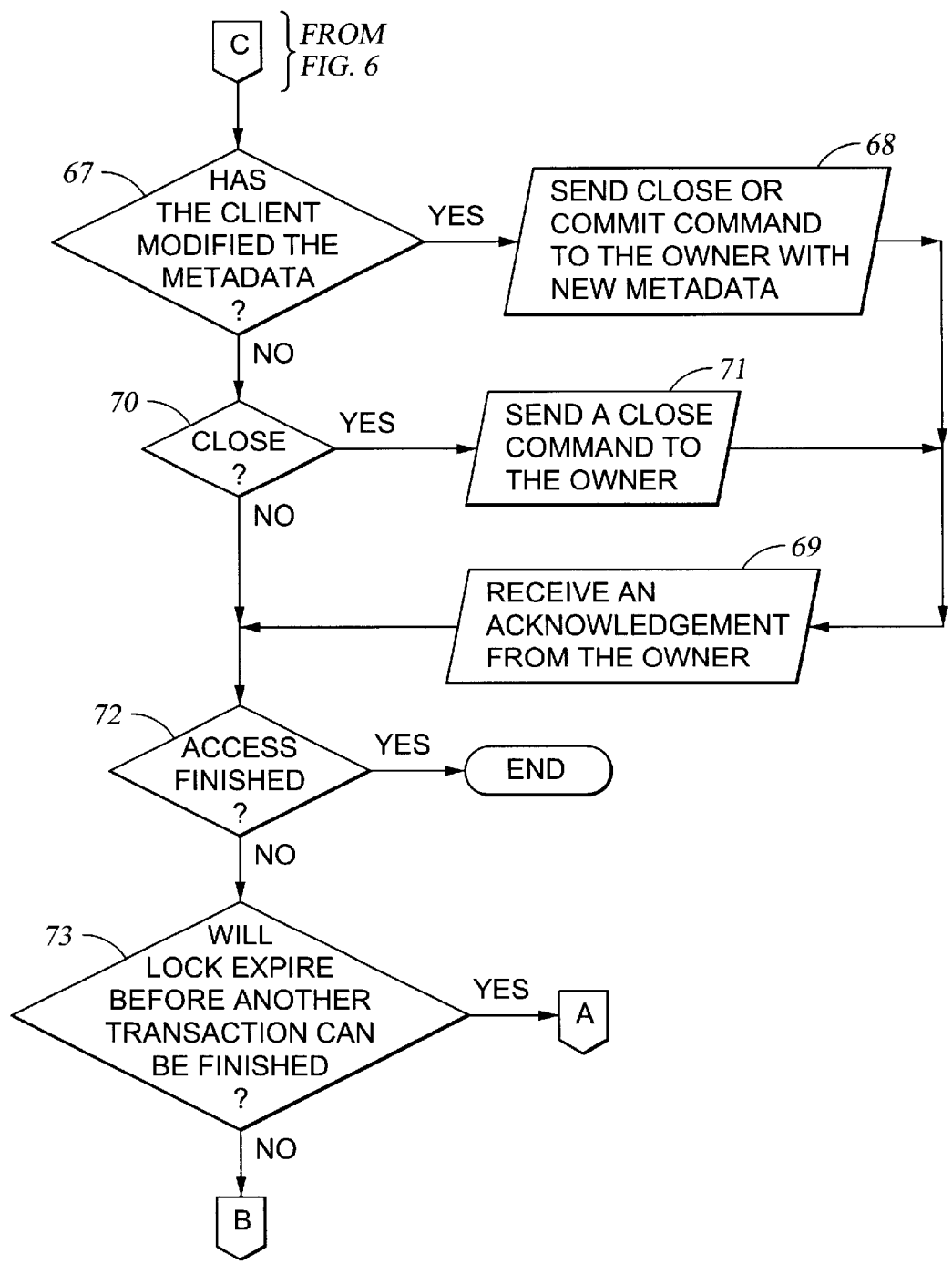
FIG. 7 is a second portion of the flow chart begun in FIG. 6.

With reference to FIG. 7, if the client has modified the metadata, then execution branches from step 67 to step 68. For example, the client will modify the metadata if the client performs a write operation that increases the length of the file. After step 68, execution continues to step 69. In step 69, the client receives an acknowledgement from the file manager that owns the file, indicating receipt of the close or commit command. If the client has not modified the metadata, then execution continues from step 67 to step 70. In step 70, execution branches to step 71 if the client desires to close the file. In step 71, the client sends a close command to the client manager that owns the file. Then, in step 69, the client receives an acknowledgement from the client manager that owns the file, indicating receipt of the close command.

After step 69, execution continues in step 72. Execution also continues from step 70 to step 72 if the client does not desire to close the file. In step 72, the client file access procedure is finished if the client has finished accessing the file. If not, execution continues from step 72 to step 73. In step 73, the value in the client's lock expiration timer is inspected to determine whether it indicates that the lock will expire before another transaction can be finished. For example, each transaction (i.e., the operations in step 66 of FIG. 6) is pre-programmed to require no more than a certain maximum amount of time, and the value in the clients lock expiration timer is compared to a predetermined threshold corresponding to this certain maximum amount of time. If the threshold is exceeded, then the lock will not expire before another transaction can be finished, and execution loops back from step 73 to step 66 in FIG. 6 to perform another transaction. Otherwise, it is possible that the lock will expire before another transaction can be finished, and therefore in this case execution branches from step 73 of FIG. 7 to step 74 of FIG. 6. In step 74, the lock expiration timer is reset, and in step 75 of FIG. 6, the client requests an extension of the lock from the lock manager that is the owner of the file. After step 75, execution continues in step 63 of FIG. 6, as described above.

Figure 8:
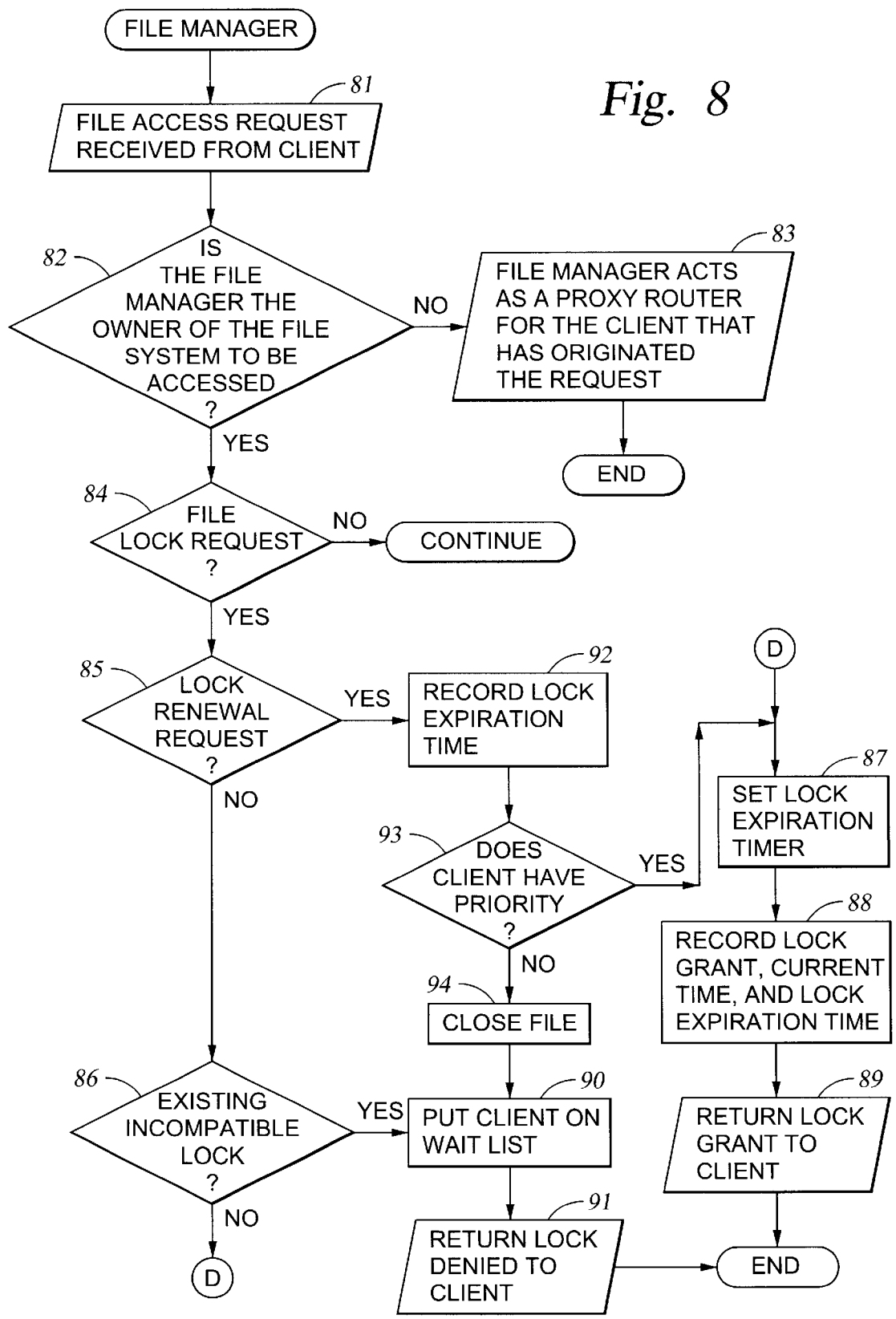
FIG. 8 is a flow chart of a procedure used by a file manager for responding to a file access request from a client.

With reference to FIG. 8, there is shown a flowchart of a file manager procedure for responding to a file access request. In a first step 81, the file manager receives a file access request from a client. The file access request specifies the file and possibly blocks of the file to be accessed, and may also specify a metadata version number. Then, in step 82, the file manager checks whether or not it is the owner of the file upon which the lock is requested. If not, then execution branches from step 82 to step 83. In step 83, the file manager acts as a proxy router for the client that has originated the request. In other words, the file manager forwards the request to the file manager than owns the file to be accessed, and returns to the client any reply from the file manager that owns the file to be accessed. After step 83, the file manager procedure is finished.

If in step 82 the file manger is the owner of the file system to be accessed, then execution continues from step 82 to step 84 in step 84, execution branches if the request is not a file lock request. Certain accesses to a file system do not require a lock, for example, a request to read file attributes. A lock, however, is required to read or write file data. If a lock is requested, then execution continues from step 84 to step 85. In step 85, execution continues to step 86 if the request is not a lock renewal request. In step 86, execution continues to step 87 so long as there is not an existing incompatible lock. For example, a desired read lock on a file is compatible with an existing lock on the same file. However, a desired read lock or a desired read-write lock is incompatible with an existing read-write lock on the same file.

Figure 9:
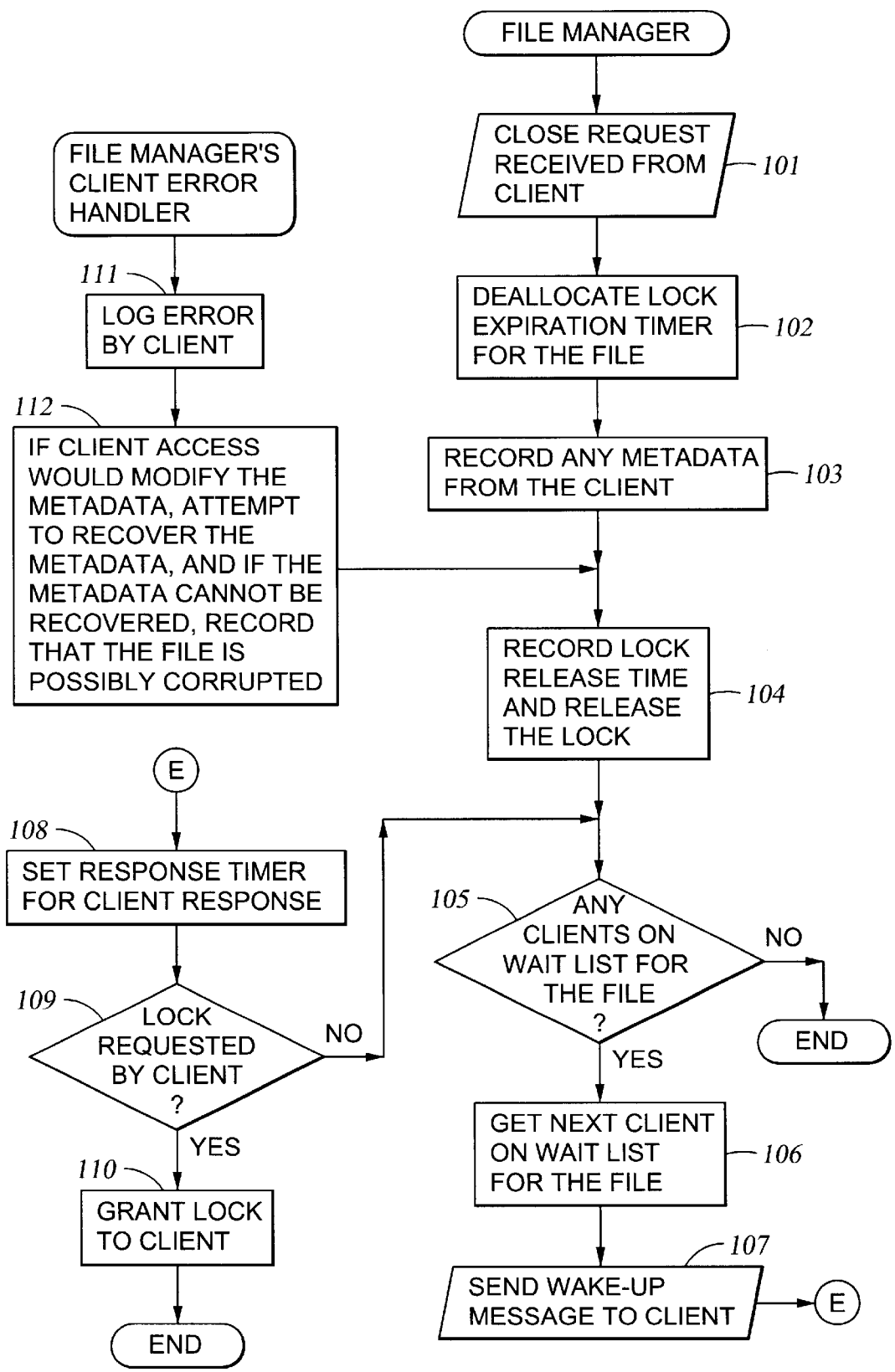
FIG. 9 is a flow chart of a procedure used by a file manager for responding to a close command from a client, and for handling a client error indicated by failure to receive a close command in a timely fashion.

In step 87, the file manager sets a lock expiration timer for the lock. The lock expiration timer is set to an initial value corresponding to the duration $\Delta_2$ in FIG. 3. The lock expiration timer is periodically decremented, in order to measure the duration $\Delta_2$ and invoke an error handling routine (as shown in FIG. 9) if and when the lock expiration timer is ever decremented to zero without receipt of a close request or a lock extension request from the client having been granted the lock. In step 88, the file manager records the lock grant, the current time (which is the lock grant time), and the lock expiration time (which is the period $\Delta_2$ from the lock grant time) in the next log file record. In step 89, the file manager returns a lock grant message to the client, and the file manager procedure of FIG. 8 is finished.

If in step 86 there is an existing incompatible lock, then the procedure branches from step 86 to step 90. In step 90, the file manager puts the client on a wait list for the file to be accessed. Then in step 91, the file manager returns a lock denied message to the client, and the file manager procedure of FIG. 8 is finished.

If in step 85 the file access request from the client is a lock renewal request, then execution branches from step 85 to step 92. In step 92, the file manager records in the log (200 of FIG. 5) the lock expiration time for the lock being renewed. In other words, the file manager indexes the record in the log that contains the client ID of the client requesting the renewal and the file ID of the lock being renewed, and which contains the other information about the lock being renewed. In step 93, execution branches to step 87 in order to renew the lock if the client has priority over any other clients in any wait list for the file being accessed. If the client does not have priority over any clients in any wait list for the file being accessed, then execution continues step 94. In this case, the lock extension is denied, in order to grant a lock to a wait-listed client that has priority. In step 94, the file manager closes the file. Then in step 90 the file manager places the client on the wait list for the file. Finally, in step 91, the file manager returns a lock denied message to the client, and the file manager procedure is finished.

FIG. 9 shows a file manager procedure that responds to a close request from a client. The close request is received in a first step 101. In step 102, the file manager deallocates the expiration timer for the file. In step 103 the file manager records any metadata from the client. In step 104, the file manager records the lock release time in the log (200 in FIG. 5) and releases the lock (from the locking information 202 in FIG. 5).

In step 105, the file manager checks whether there are any clients on any wait list for the file. If not, then the file manager procedure is finished. If so, then in step 106 the file manager obtains an identifier of the next client on the wait list for the file, and in step 107 the file manager sends a wake-up message to the next client on the wait list for the file. In step 108 the client manager sets a response timer for a response from this client. If this client responds within the response time with a request for a lock on the file, then execution continues from step 109 to step 110 to grant a lock to this client, and the file manager procedure is finished. Otherwise, if this client does not respond with a lock request on the file within the response time, then execution branches from step 109 to step 105, to possibly grant a lock to another client on the wait list.

The file manager procedure in FIG. 9 also handles an error signaled by a lock expiration timer being decremented to zero. In particular, step 55 of the file manager's periodic timer interrupt routine of FIG. 4 causes execution beginning at step 111 of FIG. 9. In step 111, the file manager logs an error by the client having the lock associated with the lock expiration timer that is decremented to zero. For example, all of the locking information for the lock is recorded in an error log file. Then in step 112, the file manager may check the lock type and file access activity by the client. For example, if the client has a read lock on the file and was reading the file, there is no problem with permitting other clients to continue accessing the file. However, if the client has a write lock on the file and has been writing to the file, the problem causing the non-receipt of the close or extension request from the client could also have caused the file manager to fail to receive metadata of the file, so the file manager should not simply permit other clients to access the file in the normal fashion. Instead, the file manager should attempt to determine whether or not the client may have modified the metadata of the file, and if the client may have modified the metadata but that metadata cannot be communicated to the file manager or recovered, then the file manager should recorded that the file is potentially corrupted, for example, by setting a file attribute in the file directory so that the file is accessible only with special permission. Execution may then continue from step 112 to step 103.

The file manager also responds to receipt of a commit request including metadata from a client. In this case, the file manager simply records metadata and returns an acknowledgement to the client.

Figure 12:
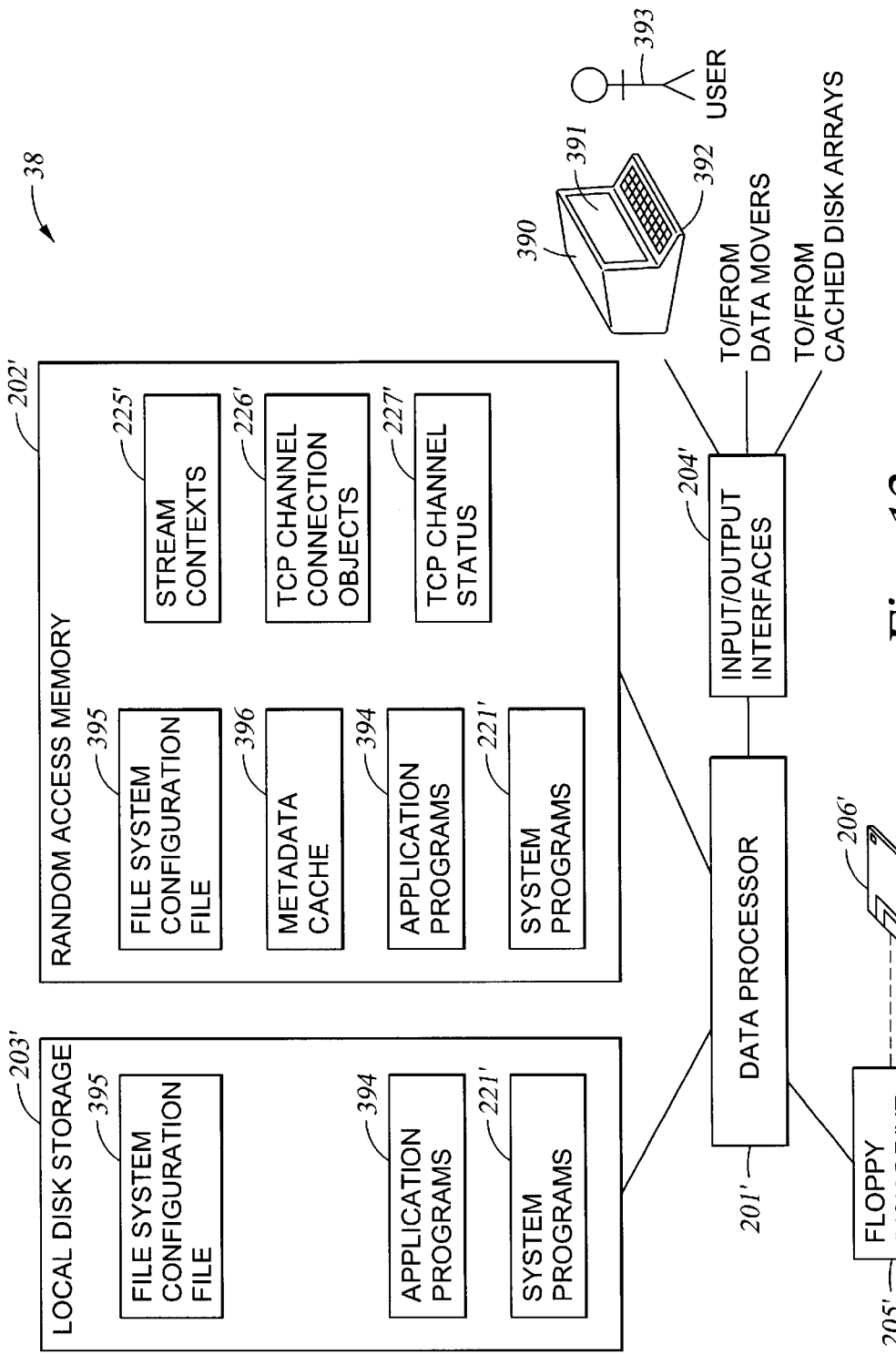
FIG. 12 is a block diagram of a client.

With reference to FIG. 12, there is shown a block diagram of the file manager 31 including programming for forwarding data access requests for accessing a file system not owned by the file manager. The file manager 31 has conventional hardware components including a data processor 201, a random access memory 202, a hard disk drive 203 providing local disk storage, input/output interfaces 204 for providing one or more data links to and from clients, other file managers, and cached disk arrays, and a removable media (floppy) disk drive 205 for receiving programs from a machine-readable program storage device such as a standard 3 and ½ inch floppy disk 206. From the removable disk 206, the local disk storage 203 can be loaded with the programs 211 to be executed by the data processor 201, the file system mapping table 212 identifying the file manager owners of the file systems in the file server system of FIG. 4, and the client/user information 213 including passwords and access rights of the clients and users permitted to access the file systems. Alternatively, the programs 211 and the file system mapping table 212 and client/user information 213 in the local disk storage 203 could be copies from a set of master files in at least one of the cached disk arrays 85, 86 of FIG. 4. In this case, the removable disk 206 need only include a program that could be initially loaded into the random access memory 202 and executed by the data processor 201 for copying the master files from one or both of the cached disk arrays 85, 96 into the local disk storage 203.

The random access memory 202 functions as a cache memory for access to the file system mapping table 212, client/user information 213, and programs 211 in the local disk storage 203. Therefore, the random access memory includes programs 221, a file system mapping table 222, and client/user information 223 that is loaded from the local disk storage 203 for random access by the data processor 201. The random access memory 202 also stores file system information 224 for file systems owned by the file manager 81. This file system information includes a directory of the files in the file systems, and attributes of the files including file access attributes, pointers to where the file data resides in the cached disk array storing the file system, and locking information. A nonvolatile copy of the file system information 224 for each file system owned by the file manager 81 is maintained in the cached disk array that stores the file system, because the file attributes are often changed by read/write file access, and the file attributes are needed for recovery of the file data in the event of a malfunction of the file manager 81. The cached disk array that stores each file system is identified in the file system mapping tables 212, 213.

In order to manage the forwarding of file access commands from the file manager 81 (to the file manager 82 in FIG. 4), the random access memory 202 in FIG. 12 also stores stream contexts 225, Transmission Control Protocol (TCP) channel connection objects 226, and TCP channel status 227.

Figure 11:
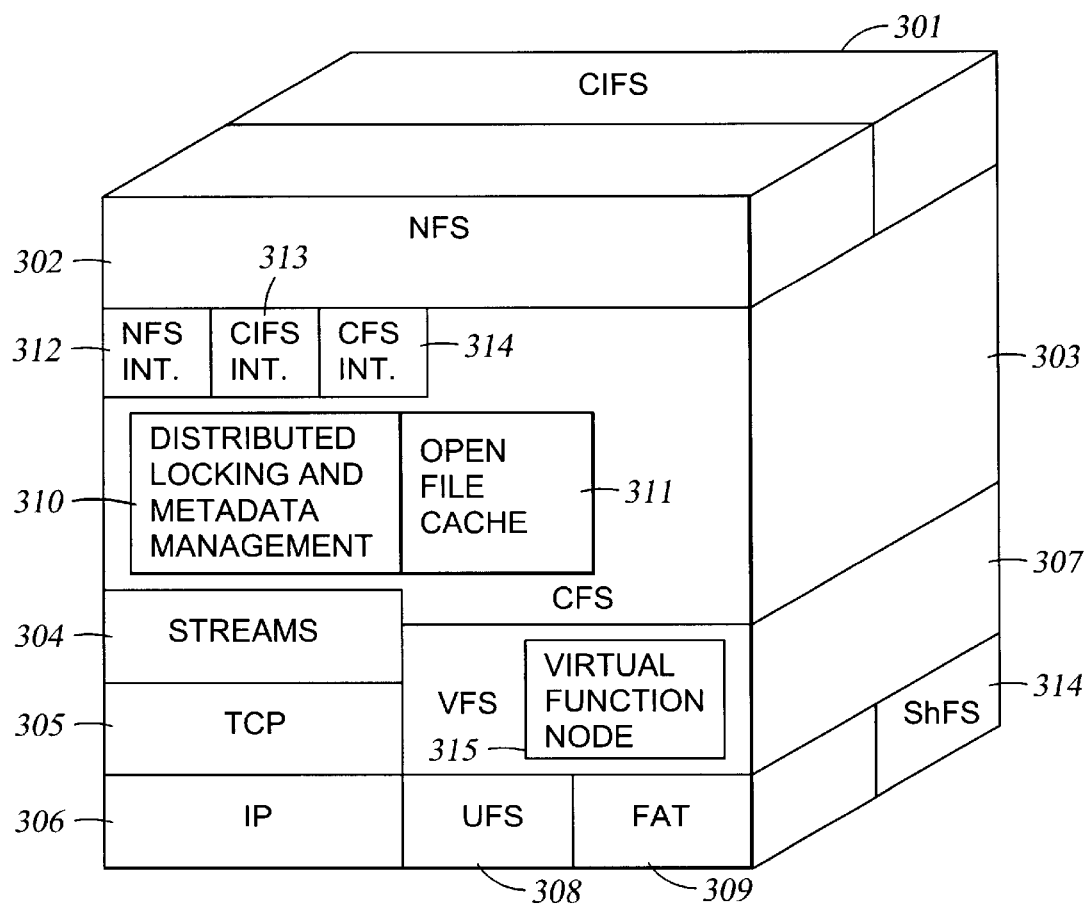
FIG. 11 is a block diagram showing a hierarchy or layering of software modules in the file manager of FIG. 10.

With reference to FIG. 11, the preferred software for a file manager in FIGS. 1 or 2 includes a number of software modules. These include a Common Internet File System (CIFS) module 301, a Network File System (NFS) module 302, a Streams module 304, a TCP module 305, an Internet Protocol module 306, a Common File System (CFS) module 303, a Virtual File System (VFS) module 307, a Universal File System (UFS) module 308, and a File Access Table (FAT) module 309. The CIFS module 301, the NFS module 302, the TCP module 305, the IP module 306, the UFS module 308, and the FAT module 309 are conventional. The CFS module 303, the Streams module 304, and the VFS module 307 are obtained by modifying conventional modules, as described below.

The modules 301, 302 for network file access protocols (CIFS, NFS) are layered over a first group of modules 304, 305, 306 for network communication (Streams, TCP, IP) and a second group of modules 303, 307, 308, 309 (CFS, VFS, UFS, FAT) for file access. The UFS and FAT modules 308, 309 implement alternative physical file systems corresponding to the physical organization of the file systems owned by the file manager and located on a local data storage device such as a cached disk array interfaced to the file manager through the UFS and FAT modules 308, 309. The control paths from these two groups of modules meet at the network file service layer, such as NFS or CIFS. So a file service protocol module, such as NFS 302 or CIFS 301, receives a request from the Streams module 304 through a respective interface 312, 313, and services the request through the CFS/VFS/UFS path. After servicing the request, the reply is directed to the client through the TCP/IP network interface.

File data is usually cached at the Common File System (CFS) layer 303, while metadata is cached at local file system layer, such as UFS 308. The Common File System (CFS, 303) sits on top of the local file systems (UFS 308, FAT 309), and collaborates with VFS 307 to provide a framework for supporting multiple file system types. To ensure the file system consistency in case of a file systems crash, the metadata is usually written to nonvolatile storage in the local data storage device as a log record instead of directly to the on-disk copy for synchronous operations.

Given this architecture, a distributed locking protocol at a file granularity level can perform well. For very large files, it may be advantageous to lock at a finer, block range level granularity. In the distributed locking protocol, every file has a file manager that is its Owner. All other file managers (secondaries) or clients must acquire proper permission from the Owner of that file before they can directly operate on that file.

Although the distributed file locking protocol could be implemented inside each network file service module (NFS and CIFS), this would not easily provide data consistency for any files or data structures accessible through more than one of the network file service modules. If multiple file services were provided over the same set of local file systems, then providing the distributed file locking protocol to only one network file service protocol will not guarantee file cache consistency. Also some of the data structures of the open file cache, maintained inside the CFS layer, are closely related to the data structures used in the distributed file locking protocol. Thus, maintaining similar data structures for the distributed file locking protocol at two or more places in different file service nodules would make the system layering less clear.

In the preferred implementation, a new distributed file locking protocol module 310 is placed inside CFS 303 and is combined with the conventional open file cache 311 that is maintained inside the CFS layer 303. CFS 303 is the central point in the system layering for supporting multiple network file services to the clients upstream and utilizing multiple types of file systems downstream. By placing the distributed file locking protocol module 310 inside CFS 303, the file locking protocol can be used by all network file service protocols and can easily provide file locking across different file services.

In the preferred implementation, the CFS modules of each file manager can exchange lock messages with its peers on other file managers. The lock protocol and messages are file protocol independent. As shown in FIG. 11, CFS 303 uses the Streams module 304 for exchanging messages with other file managers. The Streams module 304 has a conventional interface 312 to the NFS module 302 and a conventional interface 313 to the CIFS module. In order for CFS 303 to use the Streams module 304, a new interface 314 is provided to the Streams module 304. This new interface 314 is a CFS thread handing module for listening for the lock messages received by the stream module, servicing the lock messages by performing any required lock operation including the sending of lock messages to other file managers via the stream module. In addition, a new virtual function node 315 is added inside the VFS module 307 to permit CFS to get information from the underlying local file system (UFS and FAT) that is relevant to the lock operations. For example, the metadata exchanged between the file managers in the distributed file locking messages may include a disk block list. The disk block list includes pointers to the disk blocks of a file being accessed. Usually this information is hidden from VFS and CFS because this information is internal to each local file system and VFS does not care how each local file system implements its- disk operations and layout of file data on the disk storage devices. In order to allow local file systems of different file managers to cooperate with each other through the CFS layer, this information is made accessible to CFS.

Although CFS currently has a read-write locking functionality (rwlock inside File_NamingNode) for local files, it is not appropriate to use directly this read-write locking functionality for distributed file locking. There are several reasons for this. First, the rwlock function of CFS is for locking different local NFS/CFS threads, and not for locking file access of different file managers. The rwlock function is not sufficient for distributed file locking. For example, the distributed file lock needs to be able to identify which remote file manager holds which kind of lock, and also to revoke and grant locks. Second, the local file access requests and the requests from secondary file managers are at different levels in the system layering. A lock request from a secondary file manager can represent many file access requests that are local to the secondary file manager. It would be inefficient to allow each local NFS request to compete for the data-mover level file locks.

The preferred distributed locking scheme, therefore, a two-level locking scheme. First the client or file manager seeking to access a file needs to acquire the global lock which is the file manager level distributed file lock across all file managers. After obtaining the global lock, an individual file access request needs to get the local lock (the current rwlock) and to be serviced, and the individual file access request may or may not immediately obtain a local lock. Once the file access request obtains both a global and a local lock, it can be serviced by UFS; otherwise, if the file access request obtains only a global lock, it will have to wait for other local requests to finish.

There is a design choice as to how the distributed locking scheme should process a thread of the network file service (NFS or CIFS) that cannot proceed because the distributed lock is not available. A first approach is to use a conditional variable so that execution of the threads will wait until the distributed lock (shared or exclusive) becomes available. A second approach is to put the requests of the threads into a waiting queue and return with a status set to be in progress, and when the distributed lock becomes available, all waiting requests are given to the threads from a pre-allocated threads pool inside CFS. The first approach is less complicated to implement, but the second approach gives more parallelism and may improve performance under heavy loading conditions.

The use of the two-level locking scheme permits the locking at the data-mover level of the network file server architecture to be transparent to the clients and transparent any locking at the file system level. At the data-mover level, the Owner keeps track of what kind of permission each secondary file manager has with respect to each file. It is the responsibility of the Owner to keep the locks on its files consistent across all file managers. The ownership of a file does not change. The permissions may have a reasonably long enough valid period.

In the preferred locking scheme, there are two kinds of distributed lock types, shared and exclusive. A shared lock gives a file manager the permission to read the file, while an exclusive lock gives the file manager permission to modify the file and its metadata. No two file managers can hold an exclusive lock simultaneously upon a file. For each file opened on any file manager, the distributed locking and metadata management module (310 in FIG. 17) maintains the following data structure:
class LockInfo{
  Mutex mutex; // mutex to protect this LockInfo File Handle file_handle; // uniquely identify the file u_char lock_type; // can be SHARED, EXCLUSIVE, // or NONE.
  int local_readers; // reference count for local // readers (e.g., NFS requests)
  int local_writers; // reference count for local // writers (e.g., NFS requests)
  struct NFS_requests *waiting_read; // list of local read // requests waiting for shared // lock
  struct NFS_requests *waiting_write; // list of local // write requests waiting for // exclusive lock
  int version; // version number of the metadata
In this fashion, a LockInfo structure is maintained for each file opened on any file manager. Besides the informa-
tion to uniquely identify the file,. the LockInfo structure also records the reference counts of the number of local readers and writers (e.g., counts of NFS requests) who are currently holding the shared or exclusive locks, and the lists of queued local requests (read and write) which are not able to proceed because the required distributed lock is not available. The version number is used to keep the metadata up-to-date among all file managers.

The distributed locking and metadata management module (310 in FIG. 11) also maintains the following data structure of public locking information for each file owned by the file manager:
Class PriLockInfo:: public LockInfo{
  u_short remote_readers; // bit fields indicating all // remote readers // (file managers).
  u_char remote_writer; // remote writer // (file manager).
  u_short waiting_readers; // bit fields indicating all // waiting readers (file // managers), including this // file manager.
  struct DmList *waiting_writers; // list of all file // managers waiting // for exclusive lock, // including this one. // A file manager can only // have one entry in this // list.
In this fashion, on each Owner, a PriLockInfo is maintained for each file it owns. This includes remote_readers (secondary file managers which have the shared lock), remote_writer (a secondary file manager which has the exclusive lock), waiting_readers (secondary file managers who are waiting for a shared lock), and waiting_writers (all file managers who are waiting for exclusive lock).

The distributed locking and metadata management module (310 in FIG. 11) also maintains the following data structure for each file that is opened by the file manager but is not owned by the file manager:
Class SecLockInfo: : public LockInfo{
  u_char status; // indicating whether it has been // revoked by the Owner or not.
The SecLockInfo data structure therefore is maintained on each secondary file manager and only has an extra status field which indicates whether the lock has been revoked by the Owner or not.

In this preferred data-mover level locking scheme, the distributed lock couples tightly with the open file cache 311, so that the lock only applies to files, not directories.

There are four basic types of lock messages exchanged between file managers: lock request, grant, revoke, and release. The locking scheme favor writers, either local or remote, over readers. This is done to reduce the slight chance that readers are starved because of too many writers. In order to favor writers over readers, if only a shared lock and not an exclusive lock can be granted, and there are waiting writers, no shared lock is normally granted; instead, the Owner waits until the exclusive lock can be granted. This general policy need not always be followed; for example, for certain files, or certain readers or writers.

A lock can be granted to a local file access request if the lock type is compatible with the lock needed by the file access request and there are no conflicting lock requests from other file managers or the lock is not being revoked. A lock can be granted to a secondary file manager when no other file managers in the system are holding conflicting locks. Granting a lock to a secondary file manager will result in sending a lock granting message, while granting a lock to the Owner will just release all local data access requests currently waiting for the lock.

If a secondary file manager receives a local file access request, it first finds the SecLockInfo of the target file to be accessed. If the lock can be granted, the reference count is increased and the call is served. Otherwise, the file access request is put into the waiting request list and a lock request message is sent out to the Owner. When the local file access request finishes, the reference count is decreased, and if the count goes to zero and the lock is revoked, then the lock release message is sent to the Owner. If the lock grant message arrives, the SecLockInfo data structure is updated and all local file access requests waiting for that lock are dequeued and are serviced. If a lock revocation message arrives and the lock can be revoked, then the lock release message is sent out. Otherwise, the status field is set to prevent all further local file access requests from obtaining the lock.

If a local file access request is received in an Owner of the file to be accessed, the action is similar to that on a secondary file manager except that if the lock cannot be granted, then an identification of the Owner is placed into the waiting_readers or waiting_writers field. If there are secondary file managers holding conflicting locks, then the lock revocation messages are sent to them.

Similar actions are taken for lock requests from other file managers.

In a preferred scheme, a file's metadata is cached inside UFS 308 if the file is owned by the file manager, and a synchronous write only updates the metadata log, so that the metadata is only known to the Owner. Therefore, the metadata should be sent to secondary file managers if they also want to operate on the file. A version number associated with the metadata of each file is used to guarantee that every client or file manager accessing a file always uses the most up-to-date version of the metadata. Metadata is also cached on secondary file managers to improve performance. This metadata is cached inside ShFS 314 on secondary file managers. This metadata also has an associated version number. Every time the metadata is changed on a client or file manager, the version number associated with that metadata on that client or file manager is increased by one. During a commit or close operation, new metadata is written back from the owner's metadata cache to metadata storage of the file system in the data storage device (such as the cached disk array 35 or 36 in FIG. 2). To avoid a data security problem, the metadata in the file system is always written back to data storage after the corresponding data has been updated.

As described above, in order for a client to access data of a file over a data path that bypasses the Owner, the client or secondary file manager must obtain from the Owner metadata of the file in addition to a distributed lock over the file. The metadata includes the disk block numbers of the file. The disk block numbers are pointers to the disk storage locations where the file data resides. In a similar fashion, a secondary data mover can access data of a file over a data path that bypasses the Owner, provided that the secondary data mover obtains from the Owner metadata and a distributed lock over the file. The metadata is exchanged between an Owner and a secondary data mover as part of the data-mover level distributed file locking protocol.

The disk block numbers are only valid within a particular file system. Also access of these disk blocks has to go through the underlying logical volume inside the local file system. All this information is usually inside the inode structure of the file, and is stored as an in memory virtual node (vnode) inside VFS and in a corresponding inode inside UFS. The file handle of the request contains the file system id and the inode number of the target file within the file system. Since the inode number is only valid inside a file system (UFS), there is no conventional way for local file systems on a secondary file manager to directly use the inode number of a different local file system on Owner. The conventional software modules such as VFS, UFS, etc., do not provide sufficient infrastructure to permit a secondary file manager to operate on the remote files through the same interface as its local files with the file handle.

A preferred way to solve this problem is to provide a new Shadow File System (ShFS) module (314 in FIG. 11) on every client and on every secondary file manager that is permitted to obtain data over a data path that bypasses an Owner. The ShFS module is used to implement one shadow file system (ShFS) for every local file system on each Owner for which we want to provide read-write sharing. A ShFS on a secondary file manager shadows a real local file system on an Owner, so that under the new structure, the Owners are differentiated from secondary file managers. The Owner has the real local file systems, such as UFS, while secondary file manager has the shadowed local file systems. ShFS serves the file read and write requests locally on secondary file managers through read-write sharing while other NFS or CIFS requests, such as directory operations, file create, and delete, are still forwarded to the Owners because the performance gain for such operations usually are not worth the effort of exchanging locks and metadata information.

In the preferred implementation, ShFS is created and mounted on all clients and secondary file managers that will share a file system when that file system is mounted on its Owner. This is similar to the current secondary file system (SFS) except that ShFS has all the information about the volumes made of the real local file system. ShFSs provide the proper interfaces to CFS and VFS to allow operations on files owned by those file managers they shadow. Unmount UFS on an Owner results in unmounting ShFSs on all file managers that are secondary with respect to the Owner. For a request on a remote file, CFS uses the primary id and file system id inside the file handle to find the proper ShFS, and use the inode number to find the snode. Anything after that should be the same as if the file is owned by a local file manager from the CFS point of view. As soon as CFS receives the lock grant of a file from its Owner, it constructs in ShFS an inode corresponding to the snode of the file in UFS, also constructs in ShFS associated data structures. The inode in ShFS is more specifically called an "snode." ShFS accesses the volume of the file system it shadows directly by creating and opening the same volume again. Every time the volumes are changed on an Owner, the change is propagated to the ShFS on each secondary file manager, so that ShFS shadows newly added volumes or file systems. Therefore, it is preferred that the logical volume database (in the file system mapping tables 212, 213 in FIG. 10) on all file managers within a share group are the same. The implementation of ShFS and the snodes is similar to that of UFS except that ShFS directly operate on file inodes, disk blocks instead of the file names.

Because a client or secondary file manager is permitted to bypass the Owner to write directly to a file, the client or secondary file manager obtains at least a portion of the free block list of the file and then update the metadata and the file data. In a preferred implementation, when the Owner grants the exclusive data mover-level distributed file lock to the client or secondary file manager, it also gives out some portion of the free-block list to the client or secondary file manager. In this way the Owner retains the task of exclusive management of the free-block list and knowledge of how to allocate free blocks for each file that it owns. When the client or secondary file manager receives the portion of the free-block list, it can then update the metadata and file data. For file data, there is no special requirement. If the write is synchronous, then client or the secondary file manager just writes the file data directly to the disk blocks because it knows where those blocks are. However, metadata is more difficult to update. Because metadata is also written out as a record inside the log, this would require that client or secondary file manager can also directly write to both the record log and the on-disk metadata structure. This would be rather difficult to do. A compromise is that: the client or secondary file manager only writes the file data, and the metadata is just cached inside ShFS, not written to disk, neither the log nor the on-disk copy.

In the preferred implementation, there are four kinds of metadata that are logged under the file systems. These metadata are inodes, directories, allocation bitmaps, and indirect blocks. Since ShFS only deals with file reads and writes, it can only potentially modify inodes and the indirect blocks of metadata of a file. For file write requests that modify the metadata, the in-memory metadata are changed, but no logs are generated on the log disk. When the exclusive lock is to be revoked, or during a fsck, or the client or secondary file manager wants to do a commit, the client or secondary file manager sends the metadata to the Owner which writes the metadata to both the record log and on-disk copy, in that order. Since using this approach ShFS does not generate a log or touch any on-disk log at all, its implementation is much simpler than that of UFS. This approach takes advantage of the fact that NFS v3 has both synchronous and asynchronous writes. Therefore, the Owner allocates disk blocks for the secondary file manager while the client or secondary does the actual disk write operation.

There are several ways that the Owner can allocate disk blocks for the client or secondary file manager. In a preferred implementation, the client or secondary file manager tells the Owner that it wants to grow the file for some number of disk blocks. The Owner does the blocks allocation and allocates proper indirect blocks for the growth and informs the client or secondary file manager. Therefore, a client or secondary file manager works on the new file's metadata. During this allocation, the blocks are not logged inside the log on the Owner and the file's in-memory inode structure is neither changed nor logged. When the client or secondary file manager sends the metadata back, the inode and indirect blocks are updated and logged. Some unused blocks are also reclaimed, because the free disk blocks are not shareable across different files inside one shadow file system. This makes ShFS's behavior different from that of UFS.

Since ShFS does not have the usual file system structures, it does not support many of the normal file system operations, like name lookup. For those operations, ShFS can just return a proper error code as SFS currently does. A single shadow file system on a client or secondary file manager corresponds to a real local file system on a remote Owner, while the snode corresponds to the vnode inside UFS. There is a one-to-one relationship between ShFS and UFS, as well as between the snodes and corresponding vnodes except that ShFS does not have the hierarchical directory structure that UFS has. Instead, ShFS has a simple list structure, including a list of shadow file systems, and a respective list of the snodes in each of the file systems. Based on ShFS, the action of CFS and VFS need not change no matter what the underlying file node is. File data is still cached at the CFS layer. The cache (311 in FIG. 11) is invalidated if the inode is changed. The metadata is cached inside the local file system's inode, either ShFS or UFS. However, the behavior of snode is different from the behavior of the vnode. Only a vnode can be directly read from and written to disk or modified from lock messages, while snode can only be constructed using the message from the Owner and, and modified snode state is sent back to the Owner. ShFS supports the same set of interfaces to VFS/CFS as that of UFS. Buffer cache maintenance in ShFS is similar to that in UFS except that in ShFS, before a lock is granted to a secondary file manager or released to an Owner, then the buffer needs to be flushed to stable storage.

When a client request for a remote file is received, CFS searches for the file system from the primary id and fsid of the file. Then it gets the file naming node using the inode number within the file handle from the file system. During this step, the thread may block if the required lock is not available. For read and write requests, CFS blocks the thread while sending the lock request message to the Owner. Therefore, the get-node-from-handle step may take much longer. For read and write requests, this is also true on Owners if a conflicting lock is being held at secondary file managers. Requests other than read and write requests upon a remote file are done by forwarding the request to the Owner. The get-node-from-handle call is provided with an extra argument which indicates what kind of distributed lock this request needs. When the get-node-from-handle returns, the proper distributed lock is acquired and the reference count has been increased. The implementation of the inode structure of snode might be different from that of the UFS inode. On UFS, the on-disk inode is read into memory if the file is opened; however, the indirect blocks or metadata may be either in-memory or on-disk. If they are in-memory, they are stored inside the file-system-wide indirect blocks cache. This implementation makes sense because it is possible that not all indirect blocks may be in memory at the same time and the cache is necessary. The cache is maintained not on a per file basis inside each vnode but on the whole file system basis. However, on ShFS, since all the indirect blocks and other metadata must be in-memory, it doesn't make sense to use a cache to cache only part of it because ShFS can't get the metadata directly from the disk. Indirect blocks inside snode can be implemented using the structure like the on disk inode structure. On UFS, the nodes are also inside a cache, but on ShFS all nodes are in memory.

A system administrator implements ShFS by sending configuration commands to the file managers. This could be done by sending the configuration commands from a client in the data network over the data network to the file managers, or the system administrator could send the configuration commands from a control station computer over a dedicated data link to the file managers. In any event, to mount a file system to a file manager, all the volume information is sent to the Owner so that the meta volume can be constructed on the Owner. Then the file system mount command is sent to the Owner so that the Owner will create the file system from the volume. Under the new structure with ShFS, the volume create commands are also sent to all the secondary file managers that will be permitted to access that volume, and thereby create a "share group" of file managers including the Owner, and create the volume on each of the secondary file managers in the share group. Then a command to create and mount a ShFS file system is sent to all of the secondary file managers in the share group. The creation of ShFS on each secondary file manager in the share group will open the volume already created using the same mode as on the Owner. In a similar fashion, the same unmount commands are sent to both Owner and the secondary file managers in the share group during unmount.

In addition to the mount and unmount commands, the file managers should recognize a change in ownership command. To perform a change in ownership of a file system, the original owner suspends the granting of distributed file locks on the file system and any process currently holding a file lock on a file in the file system is given a reasonable time to finish accessing the file. Once all of the files in the file system are closed, the original owner changes the ownership of the file system in all of the file system mapping tables (212 in FIG. 10). Then the original owner enables the new owner to grant file locks on the files in the file system.

A procedure similar to a change in ownership is also used whenever a file manager crashes and reboots. As part of the reboot process, the network file system layer (NFS or CIFS) of the file manager that crashed sends a message to other file managers to revoke all of the distributed locks granted by the crashed file manager upon files owned by the crashed file manager. This is a first phase of a rebuild process. In a second phase of the rebuild process, the crashed file manager reestablishes, via its ShFS module, all of the distributed locks that the crashed file manager has upon files owned by the other file managers. This involves the crashed file manager interrogating the other file managers for locking information about any distributed locks held by the crashed file manager, and the crashed file manager rebuilding the ShFS data structures in the crashed file manager for the files for which the crashed file manager holds the distributed locks. This places the system in a recovery state from which client applications can begin to recover from the crash.

The preferred implementation as described above could be modified in various ways. An alternative to placing the distributed lock mechanism in CFS is to put it in inside local file system. In this alternative, a UFS on an Owner would communicate with its corresponding ShFS on a secondary file manager. This would be done so that that current NFS read or write requests would first acquire the file node from the local file system and then open the file cache given the file node. The snode should exist before the opening of the file cache.

In another alternative implementation, a cache of indirect blocks would be used for ShFS. If the memory requirements are tight on a client or secondary file manager, then the client or secondary file manager may choose to release part of the indirect blocks by sending them to the Owner while still holding the lock over that portion. When the client or secondary file manager needs that metadata for that portion again, if the information is not inside the cache, then the client or secondary file manager may get the information from the Owner.

Instead of the disk block allocation method described above, the Owner could just allocate raw disk blocks without any consideration of how those blocks would be used. The client or secondary file manager would then decide whether to use those blocks for file data or as indirect blocks.

Since each the clients need not communicate with any other client nor own any files in a file system, the software for the client could be more compact than the software for a file manager. In the preferred implementation, the clients may mount file systems on the cached disk array by sending NFS commands to a file manager. The clients also have a configuration file associating volumes with file systems. The clients move file data directly to the cached disk array using a high-speed data protocol such as is commonly used to read or write data directly to a disk drive over an SCSI or Fibre Channel link. It is desirable for the client's configuration file to indicate the volumes that the client can directly access over a bypass data path.

Figure 10:
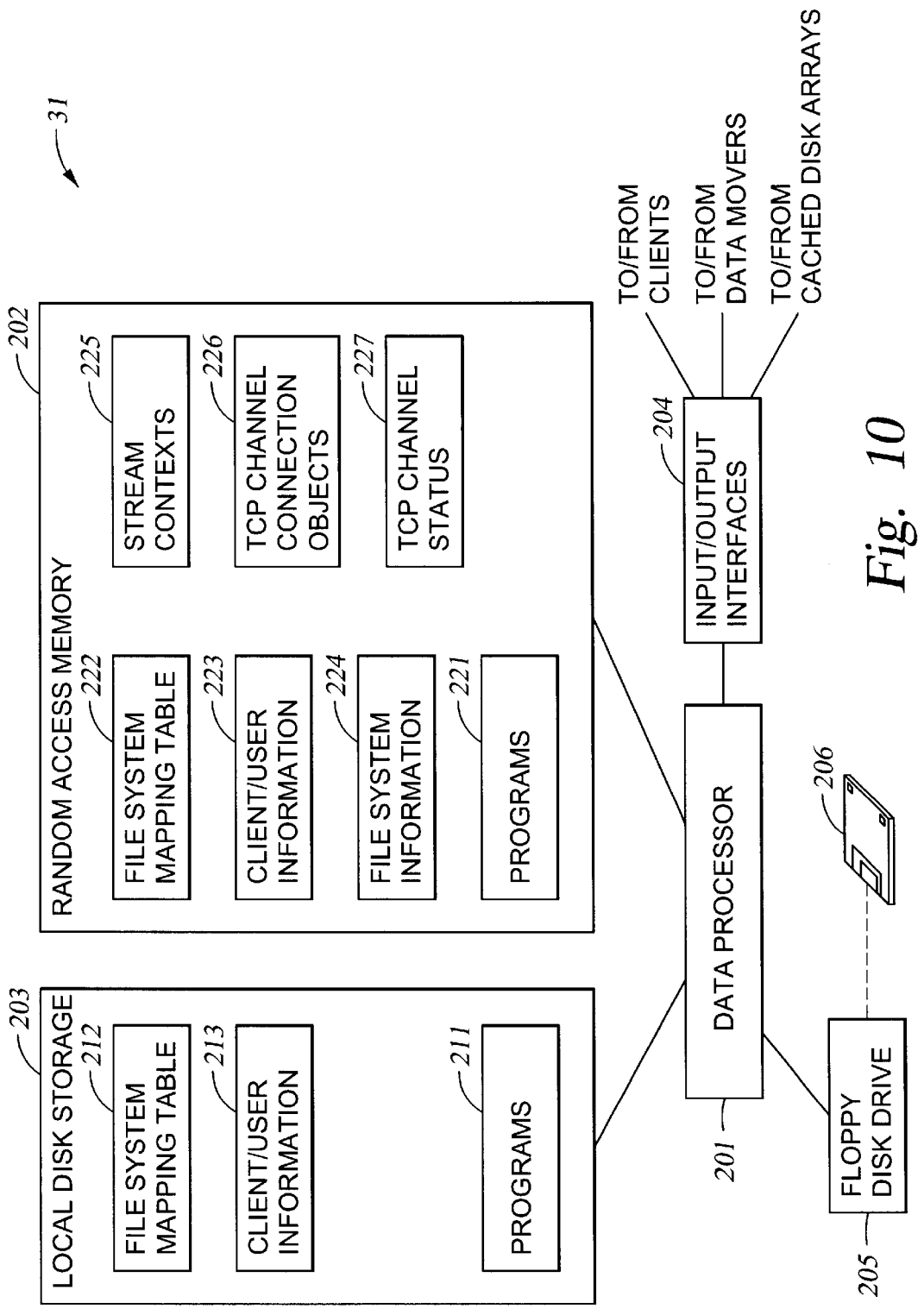
FIG. 10 is a block diagram of a file manager.

With reference to FIG. 12, there is shown a block diagram of the client 38. The client 38 is a data processing device similar to a file manager. For example, components of the client 38 in FIG. 12 that are similar to components of the file manager 31 in FIG. 10 are designated with similar but primed reference numerals. The client 38 includes a data processor 201', random access memory 202', local disk storage 203', input/output interfaces 204', and a floppy disk drive 205' for receiving programs and data from at least one floppy disk 206'. In addition, the client 88 has an input/output terminal 390 including a display 391 and a keyboard 392 for communicating with a human user 393. The local disk storage 203' contains system programs 221', application programs 394, and a file system configuration file 395. The file system configuration file indicates, for each of a number of file systems, the file managers to which the client should direct data access requests, and also indicates which of the file systems the client 88 can directly access over data paths that bypass the file managers, and the data paths or storage device ports that may be used for accessing each such file system that is directly accessible over data paths that bypass the file managers. For execution by the data processor 201', the system programs 221' and application programs 394 are loaded into the random access memory 202' from the local disk storage 203'. The random access memory 202' also stores system program state information for controlling the exchange of information with the file managers that are linked to the input/output interfaces 204' in the data network (40 in FIG. 2). This system program state information includes stream contexts 225', TCP channel connection objects 226', and TCP channel status 227'. However, the client could communicate with the file managers by a variety of network communication protocols other than TCP. The random access memory 202' is also loaded with a copy of the file system configuration file 395 and functions as a meta-data cache memory 396 for storing the metadata of files that have been opened by the client 88 for direct access of the cached disk arrays over data paths that bypass the file managers.

Figure 13:
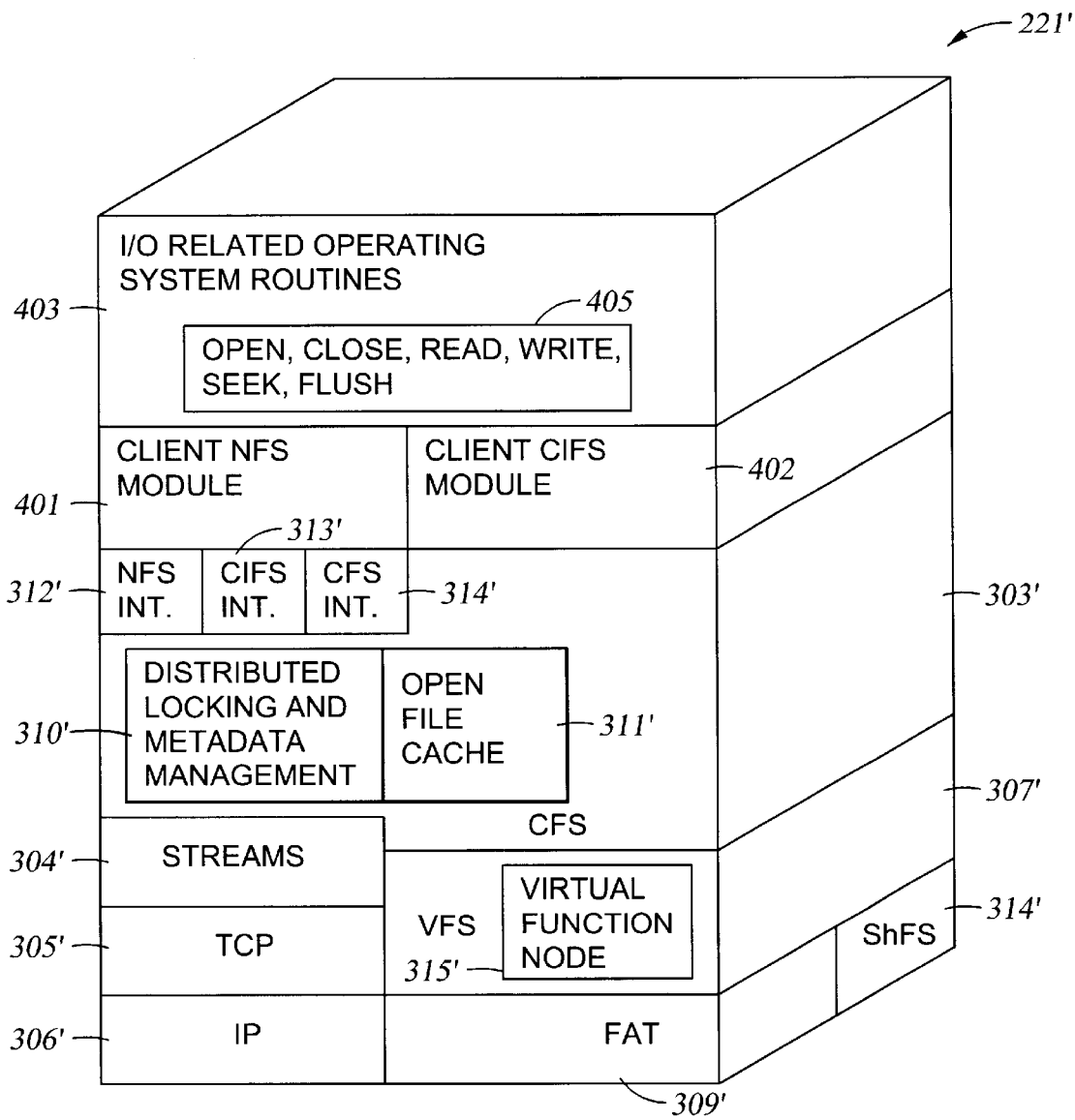
FIG. 13 is a block diagram showing a hierarchy or layering of software modules in the client of FIG. 12.

The preferred software for the clients 24 and 25 of FIG. 1 and 38 and 39 of FIG. 2 is shown in FIG. 13. Software modules in FIG. 13 that are similar to software modules in FIG. 11 are designated with similar but primed reference numerals. The software for the clients need not include routines (such as a UFS module) used by a file manager for accessing files owned by the file manager, and the server NFS and CIFS routines used by a file manager for establishing communication with a client. The client software modules include a conventional client NFS module 401 or client CIFS module 402 for transmitting client messages to the file manager (31 in FIG. 2). The conventional client NFS module 401 or client CIFS module 402, however, does not serve as the interface between the client applications and the distributed locking and metadata management module 310'. Instead, some of the client's system call routines 403 are modified to intercept or trap I/O related system calls. The modified routines 405 include routines for intercepting the open, close, read, write, seek, and flush (i.e., commit) calls from the client's application processes. For example, the modified routines replace corresponding routines in the standard C language library, and the modified routines are dynamically linked with the application programs so that recompiling or relinking of the application programs is not necessary. These modified routines serve as an interface between the client applications and the distributed locking and metadata management module 310. When such an I/O related system call occurs, it is processed as a file access command using the procedure of FIGS. 6 and 7.

Figure 14:
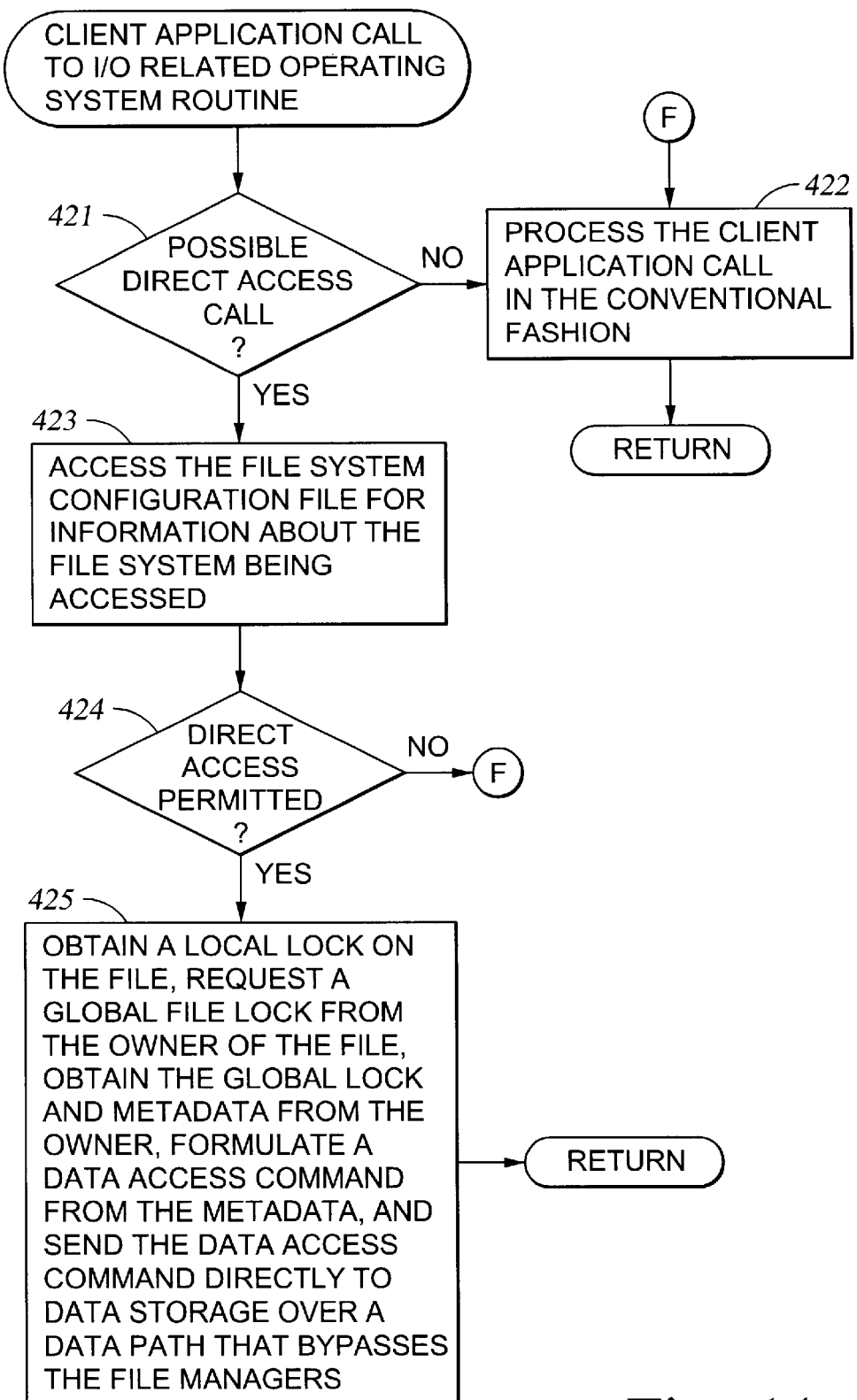
FIG. 14 is a flow chart of a procedure used by a client to process a client application call to an input/output (I/O) related operating system routine.

With reference to FIG. 14, there is shown a flowchart of the procedure followed by the client's operating system program in response to a client application call to an I/O related operating system routine. In step 421, execution branches to step 422 to process the client application call in the conventional fashion if it is not possible or desirable to process the application call by requesting the owner of the file to be access to place a lock on the file and return metadata to the client. For example, execution branches from step 421 to step 422 unless the client application call is for an open, close, read, write, seek, or flush operation. Otherwise, execution continues from step 421 to step 423. In step 423, the operating system routine accesses the file system configuration file (395 in FIG. 12) for information about the file system being accessed. If this information indicates that the client cannot directly access the file system over a data path that bypasses the file managers, then execution branches to step 422 and the client application call is processed in the conventional fashion. Otherwise, execution continues from step 424 to step 425. In step 425, the client processes the application call by obtaining a local lock on the file, requesting a global lock from the owner of the file, obtaining the global lock and any new metadata from the owner, using the metadata to formulate a data access command, and sending the data access command directly to data storage over a data path that bypasses the file managers.

The network file server architecture of FIGS. 1 and 2 allows file sharing among heterogeneous clients, and supports multiple file access protocols concurrently. The architecture permits clients using traditional file access protocols to inter-operate with clients using the new distributed locking and metadata management protocol for direct data access at the channel speed of the data storage devices. This provides a scaleable solution for full file system functionality for coexisting large and small files. The distributed locking scheme issues distributed locks that expire after a certain period of time, and there is a grace period to ensure that conflicting locks are never granted to the clients, even though the client manager may issue a lock to a waiting client immediately after failing to receive an acknowledgement that a prior conflicting lock has been released by another client. Moreover, the timing relationship between the lock request, lock grant, and lock release ensures that there is no ambiguity in the lock status as recorded in nonvolatile memory and the state of any file that is accessed by the client having been granted the lock.

What is claimed is:

1. In a data storage network in which file locks and file metadata are distributed from at least one file manager to network clients to permit the network clients to share access to file data in data storage, a method for permitting the file manager to grant a second lock upon the file data without necessarily receiving notification from a client that it has relinquished a first lock on the file data while ensuring that conflicting locks are never granted, said method comprising the steps of:

a) a client setting the beginning of a first period of time over which the client may access the file data once the first lock on the file data has been granted by the file manager, and the client sending a lock request to the file manager for obtaining the first lock on the file data;

b) the file manager receiving the lock request from the client, and responding by setting the beginning of a second period of time such that the first period of time is certain to have expired once the second period of time has expired, and granting the first lock upon the file data to the client, and transmitting a lock grant message to the client, and c) the client receiving the lock grant message, and accessing the file data so long as the client's access to the file data will be completed by expiration of the first period of time, whereby the file manager is free to grant a second lock upon the file data after expiration of the second period of time without conflict between the first lock upon the file data and the second lock upon the file data.

2. The method as claimed in claim 1, wherein the file manager returns metadata of the file to the client along with the lock grant message.

3. The method as claimed in claim 1, wherein the client's access to the file data modifies the metadata of the file, and the client returns the modified metadata of the file to the file manager after accessing the file data.

4. The method as claimed in claim 1, wherein the client performs more than one transaction upon the file data during the firs t period of time, and sends new metadata of the file t o t he file manager in a commit operation after performing each transaction.

5. The method as claimed in claim 1, wherein the client sends to the file manager a request for an extension of the first lock upon the file data before expiration of the first period of time.

6. The method as claimed in claim 1, wherein the client sends a message to the file manager confirming that the client has relinquished the first lock upon the file data by the expiration of the first period of time, and the file manager detects a failure to receive the message confirming that the client has relinquished the first lock upon the file data by the expiration of the second period of time, and upon detecting the failure, the file manager logs an error.

7. The method as claimed in claim 6, wherein the file manager begins an error recovery procedure by checking whether the client may have performed an access to the file data that would modify metadata of the file.

8. The method as claimed in claim 7, wherein the file manager finds that the client may have performed an access to the file data that would modify the metadata of the file, and recovers modified metadata of the file.

9. The method as claimed in claim 7, wherein the file manager finds that the client may have performed an access to the file data that would modify the metadata of the file, but the file manager is unable to recover modified metadata of the file, and records that the file is possibly corrupted.

10. The method as claimed in claim 1, wherein the client sets the beginning of the first period of time by setting a timer that is serviced by a periodic interrupt routine.

11. The method as claimed in claim 10, wherein the timer activates an error handler at the expiration of the first period of time when the client has failed to relinquish the lock on the file data.

12. The method as claimed in claim 10, wherein the client performs more than one access of the file data, and after each access of the file data, inspects the timer to determine whether there is sufficient time remaining to perform another access of the file data before expiration of the first period of time.

13. The method as claimed in claim 1, wherein the file manager sets the beginning of the second period of time by setting a timer that is serviced by a periodic interrupt routine.

14. The method as claimed in claim 13, wherein the timer activates an error handler at the expiration of the second period of time when the file manager has failed to receive a message from the client confirming that the client has relinquished the first lock upon the file data.

15. The method as claimed in claim 1, wherein the file manager maintains a log of file locks that are granted to the clients, the log including at least information about locks that have not yet expired.

16. The method as claimed in claim 15, wherein a record is recorded in the log for each lock that has been granted, and the record indicates the client to whom the lock has been granted, the file data which has been locked, a grant time for the lock, an expiration time for the lock, and any time of receipt of confirmation that the lock has been relinquished by the client to whom the lock has been granted.

17. A data storage network comprising data storage and at least one file manager coupled to network clients for distributing file locks and file metadata from the file manager to the network clients to permit the network clients to share access to file data in the data storage, the file manager being permitted to grant a second lock upon the file data without necessarily receiving notification from a client that it has relinquished a first lock on the file data while ensuring that conflicting locks are never granted, wherein a network client and the lock manager are programmed to grant, use, and release the first lock on the file data by:

a) the client setting the beginning of a first period of time over which the client may access the file data once the first lock on the file data has been granted by the file manager, and the client sending a lock request to the file manager for obtaining the first lock on the file data;

b) the file manager receiving the lock request from the client, and responding by setting the beginning of a second period of time such that the first period of time is certain to have expired once the second period of time has expired, and granting the first lock upon the file data to the client, and transmitting a lock grant message to the client, and c) the client receiving the lock grant message, and accessing the file data so long as the client's access to the file data will be completed by expiration of the first period of time, whereby the file manager is free to grant a second lock upon the file data after expiration of the second period of time without conflict between the first lock upon the file data and the second lock upon the file data.

18. The data storage network as claimed in claim 17, wherein the file manager is programmed to return metadata of the file to the client along with the lock grant message.

19. The data storage network as claimed in claim 17, wherein the client is programmed to modify metadata of the file during access to the file data, and the client is programmed to return the modified metadata of the file to the file manager after accessing the file data.

20. The data storage network as claimed in claim 17, wherein the client is programmed to perform more than one transaction upon the file data during the first period of time, and to send new metadata of the file to the file manager in a commit operation after performing at least one transaction.

21. The data storage network as claimed in claim 17, wherein the client is programmed to send to the file manager a request for an extension of the first lock upon the file data before expiration of the first period of time.

22. The data storage network as claimed in claim 17, wherein the client is programmed to send a message to the file manager confirming that the client has relinquished the first lock upon the file data by the expiration of the first period of time, and the file manager is programmed to detect a failure to receive the message confirming that the client has relinquished the first lock upon the file data by the expiration of the second period of time, and upon detecting the failure, to log an error.

23. The data storage network as claimed in claim 22, wherein the file manager is programmed to begin an error recovery procedure by checking whether the client may have performed an access to the file data that would modify metadata of the file.

24. The data storage network as claimed in claim 23, wherein the file manager is programmed to recover modified metadata of the file upon finding that the client may have performed an access to the file data that would modify metadata of the file.

25. The data storage network as claimed in claim 22, wherein the file manager is programmed to record that the file is possibly corrupted upon finding that the client may have performed an access to the file data that would modify the metadata of the file but the modified metadata of the file cannot be recovered.

26. The data storage network as claimed in claim 17, wherein the client is programmed to set the beginning of the first period of time by setting a timer that is serviced by a periodic interrupt routine.

27. The data storage network as claimed in claim 26, wherein the timer activates an error handler at the expiration of the first period of time when the client has failed to relinquish the lock on the file data.

28. The data storage network as claimed in claim 26, wherein the client is programmed to perform more than one access of the file data, and after each access of the file data, to inspect the timer to determine whether there is sufficient time remaining to perform another access of the file data before expiration of the first period of time.

29. The data storage network as claimed in claim 17, wherein the file manager is programmed to set the beginning of the second period of time by setting a timer that is serviced by a periodic interrupt routine.

30. The data storage network claimed in claim 29, wherein the timer activates an error handler at the expiration of the second period of time when the file manager has failed to receive a message from-the client confirming that the client has relinquished the first lock upon the file data.

31. The data storage network as claimed in claim 17, wherein the file manager is programmed to maintain a log of file locks that are granted to the clients, the log including at least information about locks that have not yet expired.

32. The data storage network as claimed in claim 31, wherein the file manager is programmed to record a record in the log for each lock that has been granted, and the record indicates the client to whom the lock has been granted, the file data which has been locked, a grant time for the lock, an expiration time for the lock, and any time of receipt of confirmation that the lock has been relinquished by the client to whom the lock has been granted.

33. A file manager for use in a data storage network in which file locks and file metadata are distributed from the file manager to the network clients to permit the network clients to share access to file data in the data storage, the file manager comprising a processor, a memory coupled to the processor for execution of a program contained in the memory, and a network port for coupling the processor to the network clients for the distribution of the file locks and the file metadata to the clients, wherein the program is executable by the processor for the file manager receiving a lock request from the client, and responding by setting the beginning of a period of time such that the period of time is certain to have expired once the client relinquishes a lock upon the file data, granting the lock upon the file data, and transmitting a lock grant message to the client.

34. The file manager as claimed in claim 33, wherein the program is executable by the processor to return metadata of the file to the client along with the lock grant message.

35. The file manager as claimed in claim 33, wherein the program is executable by the processor to grant a request from the client for an extension of the lock upon the file data received before expiration of the period of time.

36. The file manager as claimed in claim 33, wherein the program is executable by the processor to detect a failure to receive message a message from the client confirming that the client ha s relinquished the lock upon the file data by the expiration of the period of time, and upon detecting the failure, to log an error.

37. The file manager as claimed in claim 36, wherein the program is executable by the processor to begin an error recovery procedure by checking whether the client may have performed an access to the file data that would modify metadata of the file.

38. The file manager as claimed in claim 37, wherein the program is executable by the processor to recover modified metadata of the file upon finding that the client may have performed an access to the file data that would modify the metadata of the file.

39. The file manager as claimed in claim 37, wherein the program is executable by the processor to record that the file is possibly corrupted upon finding that the client may have performed an access to the file data that would modify the metadata of the file but the modified metadata of the file cannot be recovered.

40. The file manager as claimed in claim 33, wherein the program is executable by the processor to set the beginning of the period of time by setting a timer that is serviced by a periodic interrupt routine.

41. The file manager as claimed in claim 40, wherein the timer activates an error handler at the expiration of the period of time when the file manager has failed to receive a message from the client confirming that the client has relinquished the lock upon the file data.

42. The file manager as claimed in claim 33, wherein the program is executable by the processor to maintain a log of file locks that are granted to the clients, the log including at least information about locks that have not yet expired.

43. The file manager as claimed in claim 42, wherein the program is executable by the processor to record a record in the log for each lock that has been granted, and the record indicates the client to whom the lock has been granted, the file data which has been locked, a grant time for the lock, an expiration time for the lock, and any time of receipt of confirmation that the lock has been relinquished by the client to whom the lock has been granted.

44. A client for use in a data storage network including at least one file manager distributing file locks and file metadata from the file manager to network clients to permit the network clients to share access to file data in data storage, wherein the client comprises
  a processor,
  a memory coupled to the processor for execution of a program contained in the memory, and
  a network port for coupling the processor to the file manager for receiving file locks and the file metadata from the file manager,
  wherein the program is executable by the processor for the client setting the beginning of a period of time over which the client may access the file data once a lock on the file data has been granted by the file manager, and the client sending a lock request to the file manager for obtaining the lock on the file data; and
  wherein the program is executable by the processor for the client receiving a lock grant message from the file manager, and accessing the file data so long as the client's access to the file data will be completed by expiration of the period of time.

45. The client as claimed in claim 44, wherein the program is executable by the processor to modify metadata of the file during access to the file data, and to send modified metadata of the file to the file manager after accessing the file data.

46. The client as claimed in claim 44, wherein the program is executable by the processor to perform more than one transaction upon the file data during the period of time, and to send new metadata of the file to the file manager in a commit operation after performing at least one transaction.

47. The client as claimed in claim 44, wherein the program is executable by the processor to send to the file manager a request for an extension of the lock upon the file data before expiration of the period of time.

48. The client as claimed in claim 44, wherein the program is executable by the processor to send a message to the file manager confirming that the client has relinquished the lock upon the file data by the expiration of the period of time.

49. The client as claimed in claim 44, wherein the program is executable by the processor to set the beginning of the period of time by setting a timer that is serviced by a periodic interrupt routine.

50. The client as claimed in claim 49, wherein the program is executable by the processor so that the timer activates an error handler at the expiration of the first period of time when the client has failed to relinquish the lock on the file data.

51. The client as claimed in claim 44, wherein the program is executable by the processor to perform more than one access of the file data, and after each access of the file data, to inspect the timer to determine whether there is sufficient time remaining to perform another access of the file data before expiration of the period of time.

52. A program storage device containing a program for a file manager in a data storage network in which file locks and file metadata are distributed from the file manager to the network clients to permit the network clients to share access to file data in the data storage, wherein the program is executable by the file manager for the file manager receiving a lock request from the client, and responding by setting the beginning of a period of time such that the period of time is certain to have expired once the client relinquishes a lock upon the file data, and granting the lock upon the file data, and transmitting a lock grant message to the client.

53. The program storage device as claimed in claim 52, wherein the program is executable by the file manager to return metadata of the file to the client along with the lock grant message.

54. The program storage device as claimed in claim 52, wherein the program is executable by the file manager to grant a request from the client for an extension of the first lock upon the file data received before expiration of the period of time.

55. The program storage device as claimed in claim 52, wherein the program is executable by the file manager to detect a failure to receive message a message from the client confirming that the client has relinquished the lock upon the file data by the expiration of the period of time, and upon detecting the failure, to log an error.

56. The program storage device as claimed in claim 55, wherein the program is executable by the file manager to begin an error recovery procedure by checking whether the client may have performed an access to the file data that would modify metadata of the file.

57. The program storage device as claimed in claim 56, wherein the program is executable by the file manager to recover modified metadata of the file upon finding that the client may have performed an access to the file data that would modify the metadata of the file.

58. The program storage device as claimed in claim 56, wherein the program is executable by the file manager to record that the file is possibly corrupted upon finding that the client may have performed an access to the file data that would modify the metadata of the file but the modified metadata of the file cannot be recovered.

59. The program storage device as claimed in claim 52, wherein the program is executable by the file manager to set the beginning of the period of time by setting a timer that is serviced by a periodic interrupt routine.

60. The program storage device as claimed in claim 59, wherein the program is executable by the file manger so that the timer activates an error handler at the expiration of the period of time when the file manager has failed to receive a message from the client confirming that the client has relinquished the first lock upon the file data.

61. The program storage device as claimed in claim 52, wherein the program is executable by the file manager to maintain a log of file locks that are granted to the clients, the log including at least information about locks that have not yet expired.

62. The program storage device as claimed in claim 61, wherein the program is executable by the file manager to record a record in the log for each lock that has been granted, and the record indicates the client to whom the lock has been granted, the file data which has been locked, a grant time for the lock, an expiration time for the lock, and any time of receipt of confirmation that the lock has been relinquished by the client to whom the lock has been granted.

63. A program storage device containing a program for a client for use in a data storage network including at least one file manager distributing file locks and file metadata from the file manager to network clients to permit the network clients to share access to file data in data storage, wherein the program is executable by the client for setting the beginning of a period of time over which the client may access the file data once a lock on the file data has been granted by the file manager, and the client sending a lock request to the file manager for obtaining the lock on the file data; and wherein the program is executable by the client for receiving a lock grant message from the file manager, and accessing the file data so long as the client's access to the file data will be completed by expiration of the period of time.

64. The program storage device as claimed in claim 63, wherein the program is executable by the client to modify metadata of the file during access to the file data, and to send modified metadata of the file to the file manager after accessing the file data.

65. The program storage device as claimed in claim 63, wherein the program is executable by the client to perform more than one transaction upon the file data during the period of time, and to send new metadata of the file to the file manager in a commit operation after performing at least one transaction.

66. The program storage device as claimed in claim 63, wherein the program is executable by the client to send to the file manager a request for an extension of the lock upon the file data before expiration of the period of time.

67. The program storage device as claimed in claim 63, wherein the program is executable by the client to send a message to the file manager confirming that the client has relinquished the lock upon the file data by the expiration of the period of time.

68. The program storage device as claimed in claim 63, wherein the program is executable by the client to set the beginning of the period of time by setting a timer that is serviced by a periodic interrupt routine.

69. The program storage device as claimed in claim 68, wherein the program is executable by the client so that the timer activates an error handler at the expiration of the period of time when the client has failed to relinquish the lock on the file data.

70. The program storage device as claimed in claim 63, wherein the program is executable by the client to perform more than one access of the file data, and after each access of the file data, to inspect the timer to determine whether there is sufficient time remaining to perform another access of the file data before expiration of the period of time.

* * * * *

UNITED STATES PATENT AND TRADEMARK OFFICE
CERTIFICATE OF CORRECTION

PATENT NO. : 6,389,420 B1 Page 1 of 1
DATED : May 14, 2002
INVENTOR(S) : Uresh K. Vahalia, Xiaoye Jiang, Jeffrey Jon Darcy, Boris Zuckerman and Ronald Curtis Searls It is certified that error appears in the above-identified patent and that said Letters Patent is hereby corrected as shown below:

Title page,
Item [74], *Attorney, Agent, or Firm*, replace the word "BBP" with -- LLP --

Column 24,
Line 13, delete the extra space in "first"
Line 14, delete the extra space in "to" and in "the"

Column 27,
Line 7, delete the first occurrence of "message"
Line 8, delete the extra space in "has"

Column 28,
Line 59, delete the first occurrence of "message"

Column 29,
Line 17, change "manger" to -- manager --

Signed and Sealed this

Seventeenth Day of December, 2002

JAMES E. ROGAN
*Director of the United States Patent and Trademark Office*